US012570054B2

(12) United States Patent
Chiaradonna

(10) Patent No.: US 12,570,054 B2
(45) Date of Patent: Mar. 10, 2026

(54) MULTI-LAYERED SUPPORT SURFACE ASSEMBLY FOR A THREE-DIMENSIONAL PRINTER

(71) Applicant: Franco Pat Chiaradonna, Sewell, NJ (US)

(72) Inventor: Franco Pat Chiaradonna, Sewell, NJ (US)

( * ) Notice: Subject to any disclaimer, the term of this patent is extended or adjusted under 35 U.S.C. 154(b) by 155 days.

(21) Appl. No.: 18/508,249

(22) Filed: Nov. 14, 2023

(65) Prior Publication Data

US 2025/0153444 A1 May 15, 2025

(51) Int. Cl.
| | |
|---|---|
| *B29C 64/40* | (2017.01) |
| *B29C 64/182* | (2017.01) |
| *B29C 64/245* | (2017.01) |
| *B33Y 30/00* | (2015.01) |

(52) U.S. Cl.
CPC ............ *B29C 64/40* (2017.08); *B29C 64/182* (2017.08); *B29C 64/245* (2017.08); *B33Y 30/00* (2014.12)

(58) Field of Classification Search
CPC ..... B29C 64/40; B29C 64/182; B29C 64/245; B33Y 30/00
See application file for complete search history.

(56) References Cited

U.S. PATENT DOCUMENTS

| | | | |
|---|---|---|---|
| 2019/0105839 A1* | 4/2019 | Hicks | .................... B33Y 30/00 |
| 2021/0187847 A1* | 6/2021 | Smith, III | ............. B29C 64/268 |
| 2022/0219402 A1* | 7/2022 | Neill | ...................... B33Y 10/00 |

FOREIGN PATENT DOCUMENTS

| | | | | |
|---|---|---|---|---|
| EP | 3069853 A1 * | 9/2016 | ............. | B33Y 40/20 |

* cited by examiner

*Primary Examiner* — Michael M. Robinson
(74) *Attorney, Agent, or Firm* — Ashok Tankha

(57) ABSTRACT

A multi-layered support surface assembly for a three-dimensional (3D) printer is provided. One or more of the layers of the multi-layered support surface assembly are cut into multiple removable sections of preselected configurations based on size and shape of multiple objects to be three-dimensionally printed thereon. On completing the objects built thereon by the 3D printer, one or more of the removable sections are removed for further processing, without disturbing positions of incomplete objects being built on other removable sections. The layers include a base plate to be secured to a support platform of the 3D printer; a sheet magnet layer secured to a top surface of the base plate; an upper plate secured to a top surface of the sheet magnet layer; an adhesive layer secured to a top surface of the upper plate; and a foam grow surface pad secured to a top surface of the adhesive layer.

19 Claims, 18 Drawing Sheets

MULTI-LAYERED SUPPORT SURFACE ASSEMBLY FOR A THREE-DIMENSIONAL PRINTER

BACKGROUND

Three-dimensional (3D) printing is a form of additive manufacturing that uses a 3D printer for creating physical 3D objects by adding raw material layer by layer onto a support surface or a print bed of the 3D printer. The 3D printer includes a nozzle through which the raw material is extruded. The extruded raw material is released onto the support surface layer by layer, thereby building a 3D object. The 3D printing process comprises creating a digital 3D model of an object using computer-aided design (CAD) software; slicing the digital 3D model into thin, horizontal layers; generating a set of instructions configured to guide the 3D printer on creating each layer; and converting the instructions for each layer into a numerical control programming code, for example, G-code. The G-code contains commands for the components of the 3D printer. For example, the G-code instructs the 3D printer on how to move its print head, heat the nozzle, extrude the raw material, and perform other required actions to build a 3D object layer by layer. The 3D printer builds the 3D object layer by layer, typically, by melting or curing a raw material, for example, plastic, metal, resin, ceramics, etc. Batch 3D printing, also referred to as bulk 3D printing or volume 3D printing, is a cost-effective 3D printing method for building multiple 3D objects and/or parts simultaneously. Batch 3D printing minimizes downtime for the 3D printer. However, 3D printing has an inherent limitation when building or growing more than one 3D object at a time, that is, the inability to remove shorter layered 3D objects, as they complete, from the support surface of the 3D printer and allow taller layered 3D objects to continue being built on the support surface of the 3D printer.

3D object and/or parts building typically begins during an artwork design stage in initial CAD programming. Many projects to build or grow different 3D objects can be programmed to a support surface of the 3D printer for simultaneous builds. 3D object manufacturers that operate 3D printers need to maximize the number of 3D objects that can be built simultaneously without interruption. There is a need for a 3D printer to recognize and accommodate multiple build projects that are dependent on actual size of the 3D objects to be built, while considering different configurations of the 3D objects in a single build.

Consider an example where a 3D object designer initiates a build or grow process with six (6) 3D objects to build. In this example, digital 3D models of the 3D objects are designed with layers of different heights and programmed to the 3D printer. Conventional software confirms that the tallest 3D objects have the longest build or grow time. In this example, the 3D printer recognizes one build project comprising locations for the six 3D objects determined by the 3D object designer. The 3D printer initiates the process of placing build and support layering on a conventional one-piece grow plate disposed on a support platform of the 3D printer. The process of building or growing the 3D objects on the conventional one-piece grow plate continues until the tallest layered 3D object is complete. The conventional manufacturing process, by nature of the technology, disallows the removal of completed, shorter layered 3D objects or any of the 3D objects on the one-piece grow plate until all the 3D objects are complete, which causes delays in finishing shorter layered 3D objects, which may exceed a period of time between several hours to several days. There is no safe method for removing completed 3D objects from a build or grow support surface without disturbing the exact positioning of taller layered 3D objects until the taller layered 3D objects complete their respective builds. There is a need for a support surface assembly for the 3D printer that allows removal of the completed 3D objects from the build or grow support surface without disturbing the exact positioning of taller layered 3D objects until the taller layered 3D objects complete their respective builds. The delay in removing the completed 3D objects impacts a timely delivery of the built 3D objects to clients, which results in cancelation of orders for the 3D objects and loss of business.

Moreover, the 3D printing process comprises a milling or shaving operation performed between placement of each layer to ensure accuracy of the built 3D object. Upon the completion of the tallest layered 3D object, the conventional one-piece grow plate is removed from the support platform of the 3D printer and placed on a heating device, for example, a hot plate, for removal of all the 3D objects disposed thereon. The support surface material of the one-piece grow plate melts at a lower temperature than the raw material used to build the 3D object(s), herein referred to as a build material, and allows for the removal of the 3D object(s) from the one-piece grow plate. Before the next 3D object(s) is scheduled for building, the one-piece grow plate is placed back onto the support platform of the 3D printer and a foam pad of the one-piece grow plate is milled or shaved to remove any build or support materials left behind on the one-piece grow plate. With each new build process, the milling or shaving operation causes the removal of the top layer of the foam pad until the foam pad becomes unsuitable for continued use, thereby requiring replacement of the foam pad.

In conventional 3D printing, the conventional one-piece grow plate with the build or grow support surface is prohibited from being removed from the support platform of the 3D printer until the build of the tallest layered 3D object, that is, the 3D object with the longest projected build time, is complete. The prohibition to remove the one-piece grow plate until the build of the tallest layered 3D object is complete precludes an operator from performing subsequent product processes for the completed shorter layered 3D objects, since the operator must wait until the tallest layered 3D object is complete.

Hence, there is a long-felt need for a multi-layered support surface assembly for a 3D printer, for allowing removal of shorter layered 3D objects as they complete in a batch process, while maintaining the exact positioning of taller layered 3D objects and continuing building of the taller layered 3D objects on the build or grow support surface until completion of their respective builds.

SUMMARY OF THE INVENTION

This summary is provided to introduce a selection of concepts in a simplified form that are further disclosed in the detailed description of the invention. This summary is not intended to determine the scope of the claimed subject matter.

The apparatus disclosed herein addresses the above-recited need for a multi-layered support surface assembly for a three-dimensional (3D) printer, for allowing removal of shorter layered 3D objects as they complete in a batch process, while maintaining the exact positioning of taller layered 3D objects and continuing building of the taller layered 3D objects on a build or grow support surface until completion of their respective builds. The multi-layered support surface assembly disclosed herein is configured as a versatile build or grow plate for use in the high quality 3D printing industry. The multi-layered support surface assembly comprises multiple layers, where one or more of the layers are cut into multiple removable sections of preselected configurations based on size and shape of multiple objects to be three-dimensionally printed thereon. On completion of one or more of the objects built on one or more of the removable sections by the 3D printer, the removable section(s) with the built object(s) is configured to be removed for further processing, without disturbing positions of incomplete objects being built on the other removable sections.

In an embodiment, the multi-layered support surface assembly comprises five (5) layers, namely, a base plate, a sheet magnet layer, an upper plate, an adhesive layer, and a foam grow surface pad. In an embodiment, the base plate and the upper plate are electroplated, and the sheet magnet layer is uncoated. The base plate is configured to be secured to a support platform of the 3D printer. In an embodiment, the base plate is made of cold rolled steel. In another embodiment, the base plate is made of hot rolled pickled and oiled (HRPO) steel. The base plate comprises one or more mounting elements, for example, mounting holes, and tabs configured to facilitate securement of the base plate to the support platform of the 3D printer. The sheet magnet layer is disposed on a top surface of the base plate. The sheet magnet layer comprises a top magnetic surface and a bottom adhesive surface. The bottom adhesive surface of the sheet magnet layer is secured to the top surface of the base plate. In an embodiment, the upper plate is made of cold rolled steel. In another embodiment, the upper plate is made of HRPO steel. The upper plate is disposed on the top magnetic surface of the sheet magnet layer. The upper plate comprises one or more mounting elements, for example, mounting holes, corresponding to the mounting element(s) of the base plate. The mounting element(s) of the upper plate is configured to facilitate securement of the upper plate to the base plate. The upper plate is secured to the sheet magnet layer by a magnetic force of the top magnetic surface of the sheet magnet layer.

In an embodiment, the adhesive layer is a double-sided, high-heat-resistant, adhesive layer comprising a top adhesive surface and a bottom adhesive surface. Each of the top adhesive surface and the bottom adhesive surface of the adhesive layer comprises an adhesive material protected by a backing element, for example, a paper backing. The adhesive layer is disposed on a top surface of the upper plate. The bottom adhesive surface of the adhesive layer is secured to the top surface of the upper plate. The backing element on the bottom adhesive surface of the adhesive layer is removed to expose the adhesive material and fasten the bottom adhesive surface of the adhesive layer to the top surface of the upper plate.

In an embodiment, the foam grow surface pad is a high-density, high-heat-resistant, foam grow surface pad. The foam grow surface pad is secured to the top adhesive surface of the adhesive layer. The backing element on the top adhesive surface of the adhesive layer is removed to expose the adhesive material and fasten a bottom surface of the foam grow surface pad to the top adhesive surface of the adhesive layer. The foam grow surface pad together with the upper plate secured thereto by the adhesive layer is cut into multiple removable sections of preselected configurations based on size and shape of multiple objects to be three-dimensionally printed thereon. On completion of one or more of the objects built on one or more of the removable sections by the 3D printer, the removable section(s) with the built object(s) is configured to be lifted off the sheet magnet layer and removed from the base plate for further processing, without disturbing positions of incomplete objects being built on the other removable sections.

In an embodiment, the base plate and the upper plate are provided with user instructions for optimizing design placement, object placement, and object building for early removal of a completed object(s) on the removable section(s) while the incomplete objects continue to be built on the other removable sections without disruption.

Disclosed herein is also a method for assembling a multi-layered support surface assembly. In the method disclosed herein, multiple layers, namely, a base plate, a sheet magnet layer, an upper plate, an adhesive layer, and a foam grow surface pad as disclosed above, are provided. The method disclosed herein comprises securing the bottom adhesive surface of the sheet magnet layer to the top surface of the base plate; securing the upper plate on the top magnetic surface of the sheet magnet layer using a magnetic force of the top magnetic surface of the sheet magnet layer; securing the bottom adhesive surface of the adhesive layer to the top surface of the upper plate; securing the foam grow surface pad on the top adhesive surface of the adhesive layer; and cutting the foam grow surface pad together with the upper plate secured thereto by the adhesive layer into multiple removable sections of preselected configurations based on size and shape of multiple objects to be three-dimensionally printed thereon. On completion of one or more of the objects built on one or more of the removable sections by the 3D printer, the removable section(s) with the built object(s) is configured to be lifted off the sheet magnet layer and removed from the base plate for further processing, without disturbing positions of incomplete objects being built on the other removable sections.

In an embodiment, the multi-layered support surface assembly is secured to the 3D printer by securely mounting the base plate of the assembled multi-layered support surface assembly on the support platform of the 3D printer using the mounting elements of the base plate; and securing the mounted base plate to the support platform of the 3D printer by clamping the tabs of the base plate to the support platform of the 3D printer. The method disclosed herein further comprises (a) executing 3D printing of the objects on the removable sections of the multi-layered support surface assembly by the 3D printer in a batch process; (b) on completing the 3D printing of one or more of the objects built on one or more of the removable sections by the 3D printer, momentarily terminating the 3D printing of the objects; (c) removing the removable section(s) with the object(s) built thereon by the 3D printer from the sheet magnet layer and in turn, from the base plate, for further processing without disturbing positions of the other objects being built on the other removable sections; (d) resuming the 3D printing of the other objects on the other removable sections by the 3D printer; and (e) repeating the steps (b), (c), and (d) until the 3D printing of all the objects is completed.

In one or more embodiments, related systems comprise circuitry and/or programming for executing the methods disclosed herein. The circuitry and/or programming comprise one or any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific components, structures, and methods disclosed herein. The description of a component, or a structure, or a method step referenced by a numeral in a drawing is applicable to the description of that component, or structure, or method step shown by that same numeral in any subsequent drawing herein. The terms "top", "bottom", "front", "side", "right", "upper", "inner", "outer", etc., are based on an orientation or a positional relationship shown in the appended drawings, and are recited merely for describing the embodiments herein, rather than indicating or implying that the component or structure referenced must have a particular orientation or position or must be constructed and operated in a particular orientation, and therefore should not be construed as limiting the embodiments herein.

DETAILED DESCRIPTION OF THE INVENTION

Figure 10A:
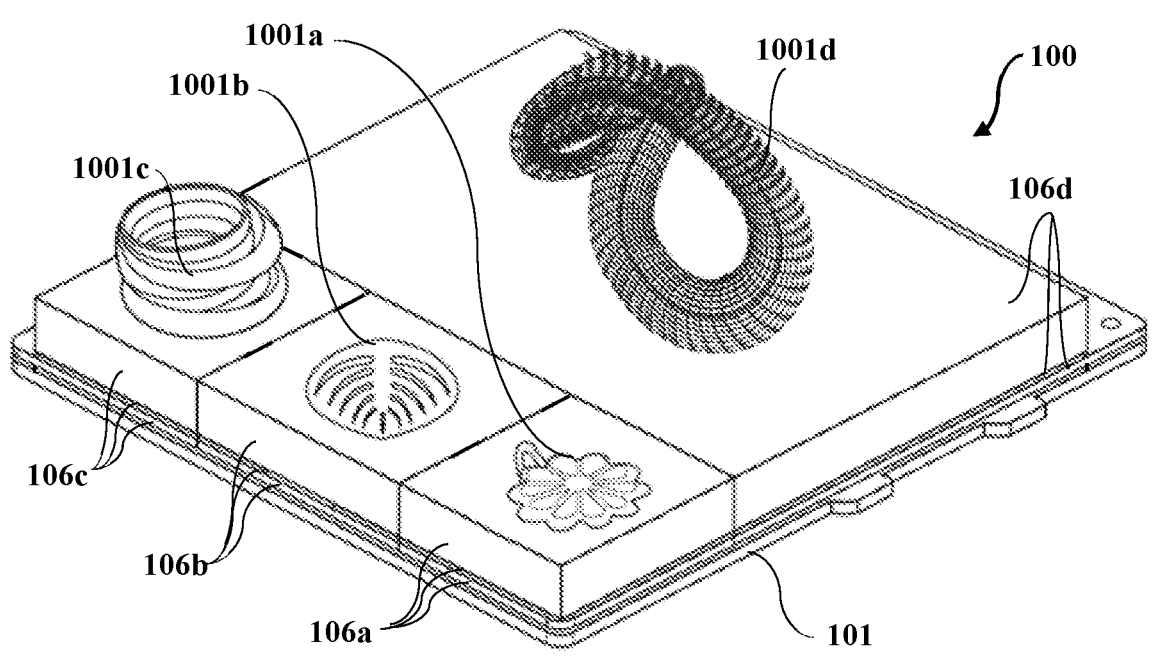
FIG. 10A illustrates a top perspective view of the embodiment of the multi-layered support surface assembly shown in FIG. 1A, showing assembled removable sections of the multi-layered support surface assembly with multiple objects three-dimensionally printed by the 3D printer thereon.
Figure 10B:
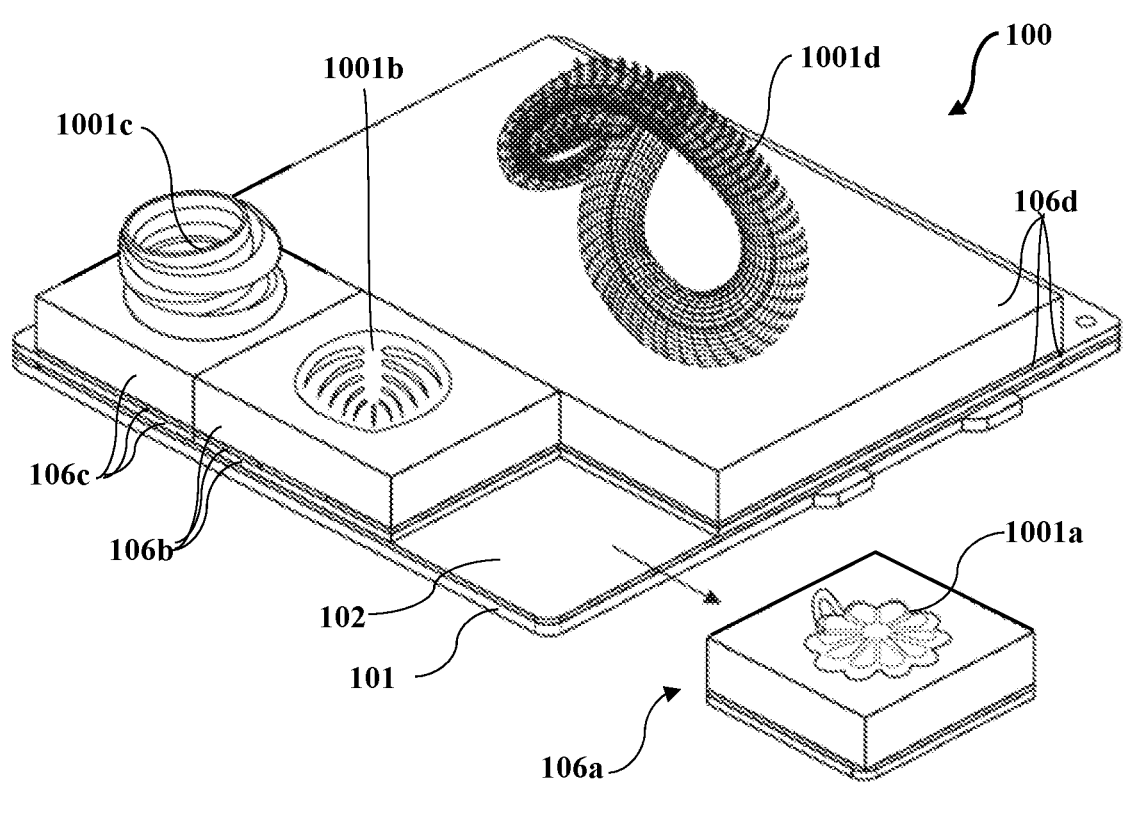
FIG. 10B illustrates a top perspective view of the embodiment of the multi-layered support surface assembly shown in FIG. 1A, showing removal of one of the assembled removable sections of the multi-layered support surface assembly with a completely built object, from a sheet magnet layer and in turn, from the base plate of the multi-layered support surface assembly for further processing, without disturbing positions of incomplete objects being built on other removable sections.

Disclosed herein is a multi-layered support surface assembly 100 comprising multiple layers 101, 102, 103, 104, and 105, where one or more of the layers, for example, 103, 104, and 105, are cut into multiple removable sections 106a, 106b, 106c, and 106d of preselected configurations based on size and shape of multiple objects, for example, 1001a, 1001b, 1001c, and 1001d to be three-dimensionally printed thereon, as illustrated in FIGS. 1A-1D and FIGS. 10A-10B. On completion of one or more of the objects, for example, 1001a, built on one or more of the removable sections, for example, 106a, by a three-dimensional (3D) printer 801 illustrated in FIGS. 8A-8B, the removable section(s) 106a with the built object(s) 1001a is configured to be removed for further processing, without disturbing positions of incomplete objects, for example, 1001b, 1001c, and 1001d, being built on the other removable sections 106b, 106c, and 106d as illustrated in FIGS. 10A-10B.

Figure 1A:
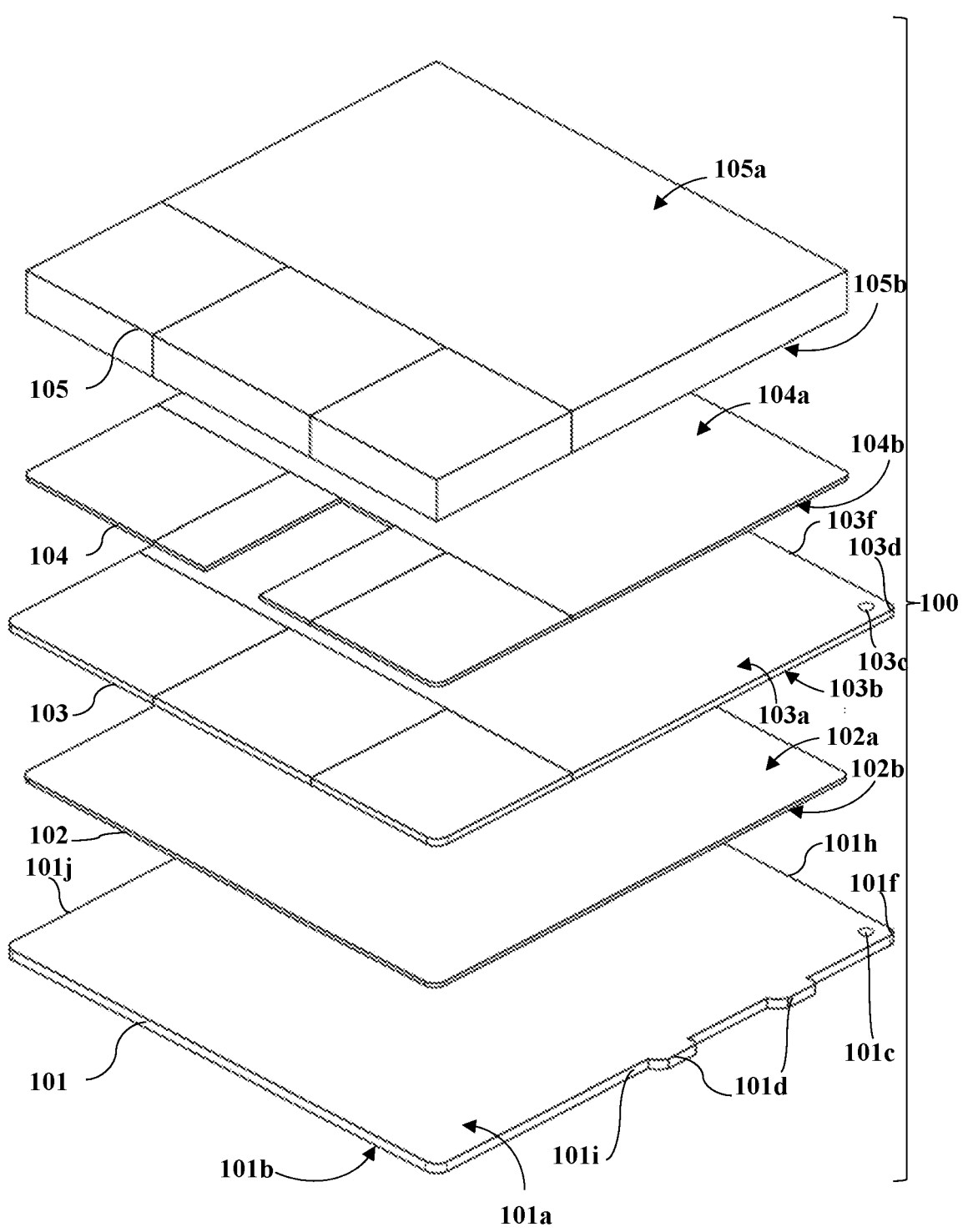
FIG. 1A illustrates an exploded, top perspective view of an embodiment of a multi-layered support surface assembly for a three-dimensional (3D) printer.
Figure 1B:
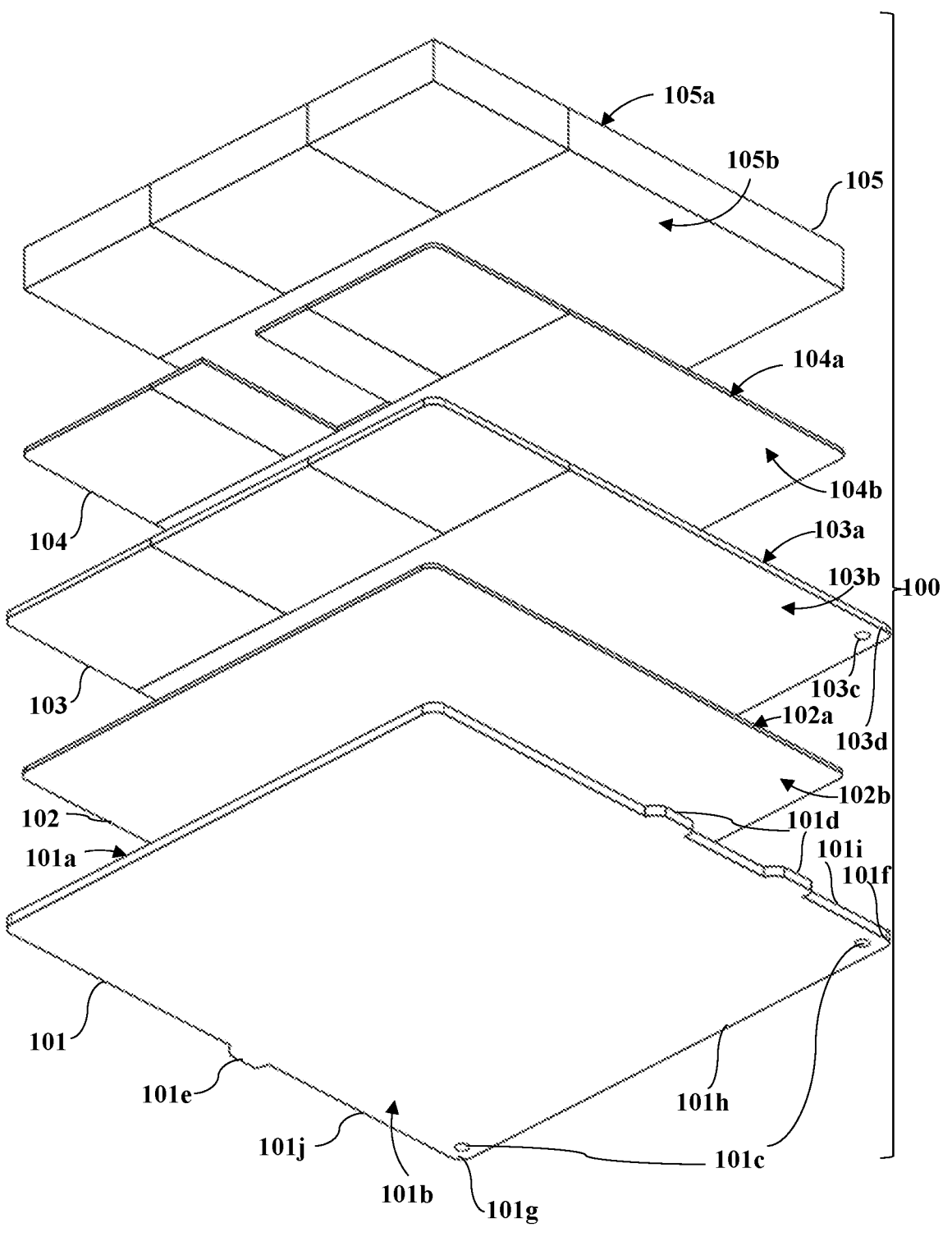
FIG. 1B illustrates an exploded, bottom perspective view of the embodiment of the multi-layered support surface assembly shown in FIG. 1A.
Figure 5A:
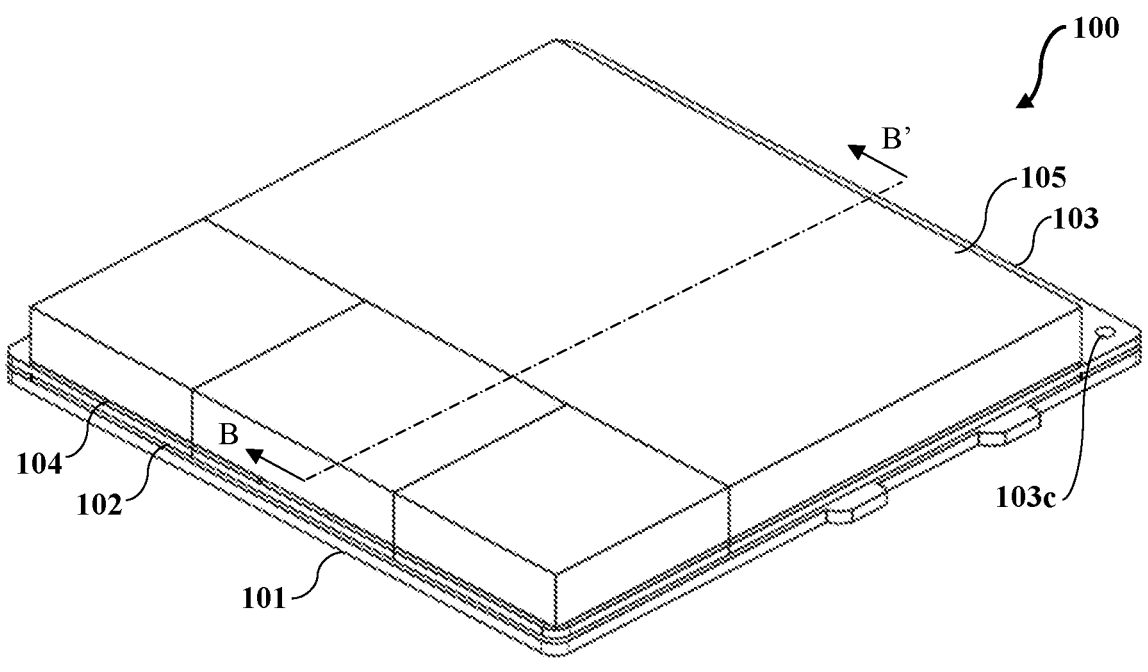
FIG. 5A illustrates a top perspective view of the embodiment of the multi-layered support surface assembly shown in FIG. 1A, showing assembled layers of the multi-layered support surface assembly.
Figure 8A:
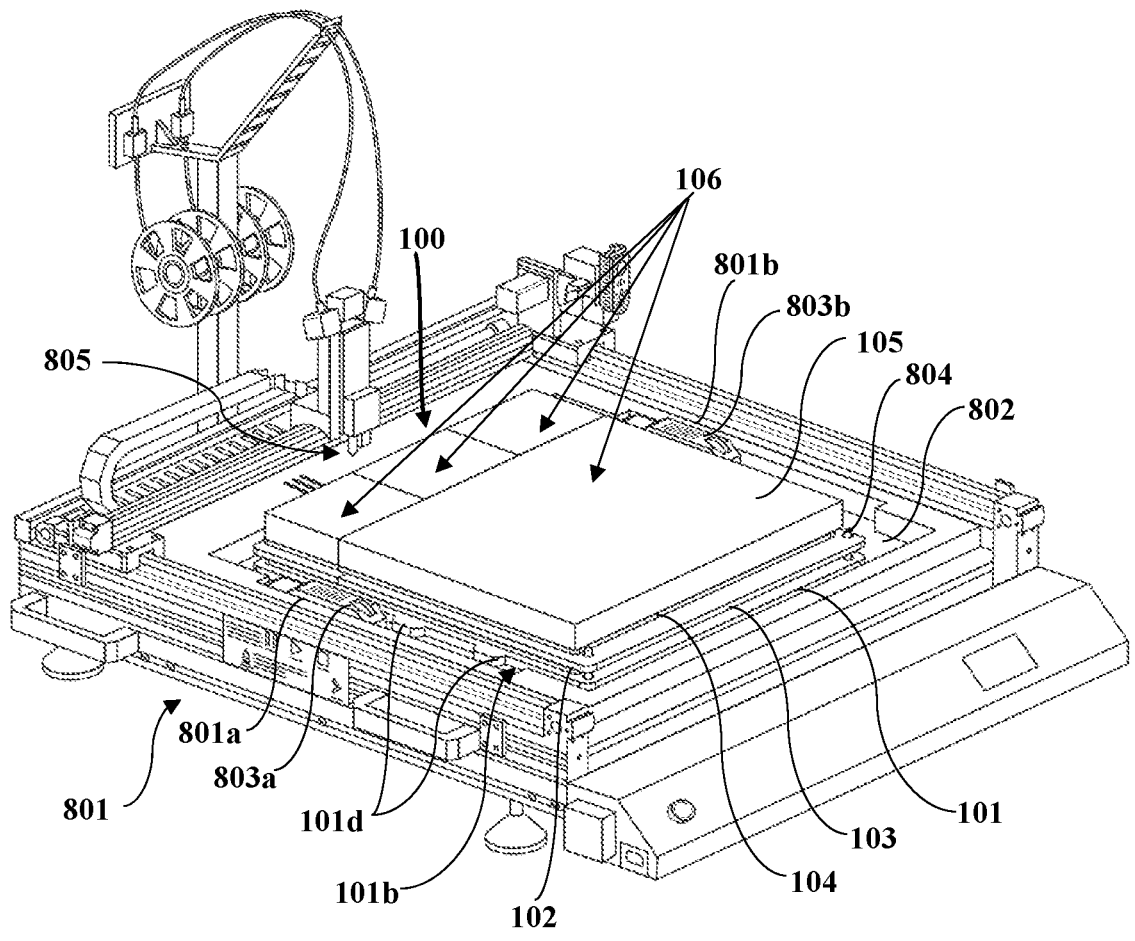
FIGS. 8A-8B illustrate top perspective views of the embodiment of the multi-layered support surface assembly shown in FIG. 1A, secured to a support platform of a 3D printer.
Figure 8B:
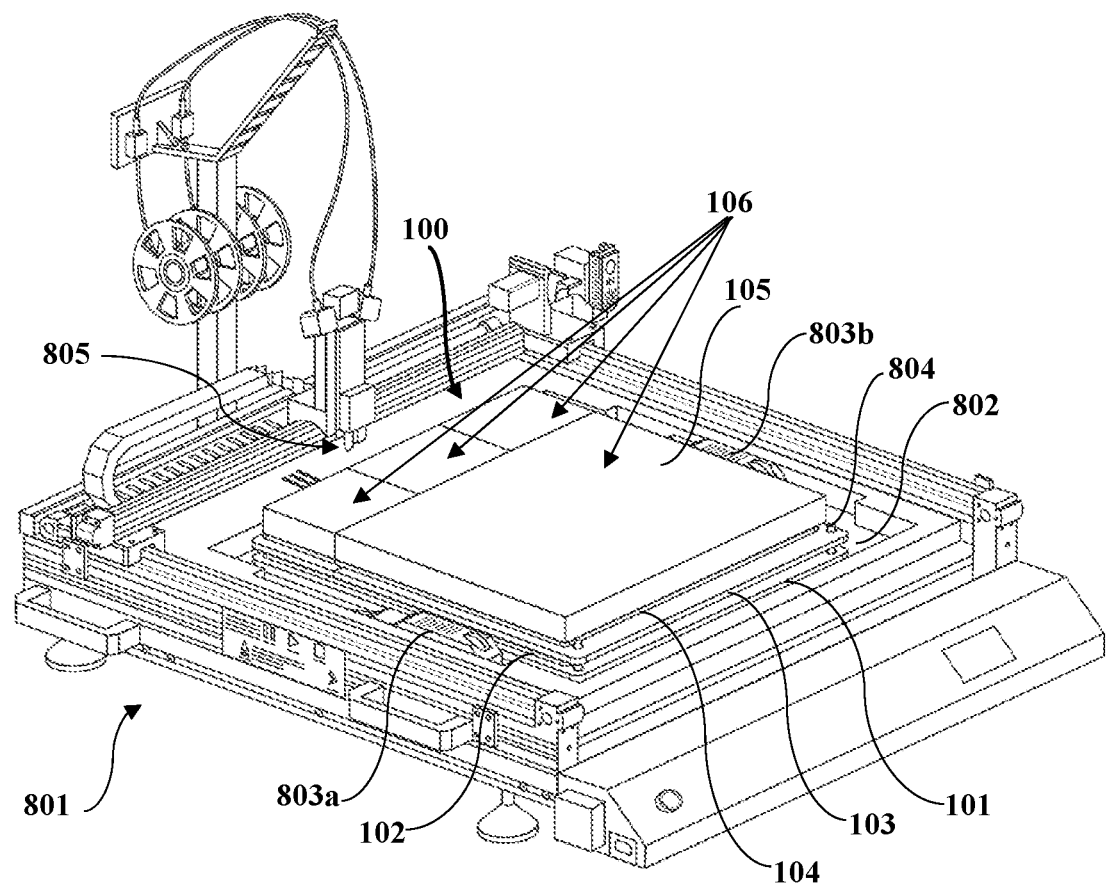

FIGS. 1A-1B illustrate an exploded, top perspective view and an exploded, bottom perspective view, respectively, of an embodiment of the multi-layered support surface assembly 100 for a three-dimensional (3D) printer 801 illustrated in FIGS. 8A-8B. In an embodiment, the multi-layered support surface assembly 100 comprises five (5) separate components, herein referred to as "layers", namely, a base plate 101, a sheet magnet layer 102, an upper plate 103, an adhesive layer 104, and a foam grow surface pad 105, that are assembled to create a versatile grow plate as illustrated in FIG. 5A. In an embodiment, the base plate 101 and the upper plate 103 are generally rectangular-shaped plates. In an embodiment, the sheet magnet layer 102, the adhesive layer 104, and the foam grow surface pad 105 are generally square-shaped layers. In another embodiment, each of the five layers 101, 102, 103, 104, and 105 is of a configurable shape preselected by a consumer or a buyer. In an embodiment, the base plate 101 and the upper plate 103 are electroplated. In an example, the base plate 101 and the upper plate 103 are electroplated with zinc plating. In an embodiment, the sheet magnet layer 102 is uncoated. An uncoated sheet magnet layer 102 allows for resistance.

Figure 1C:
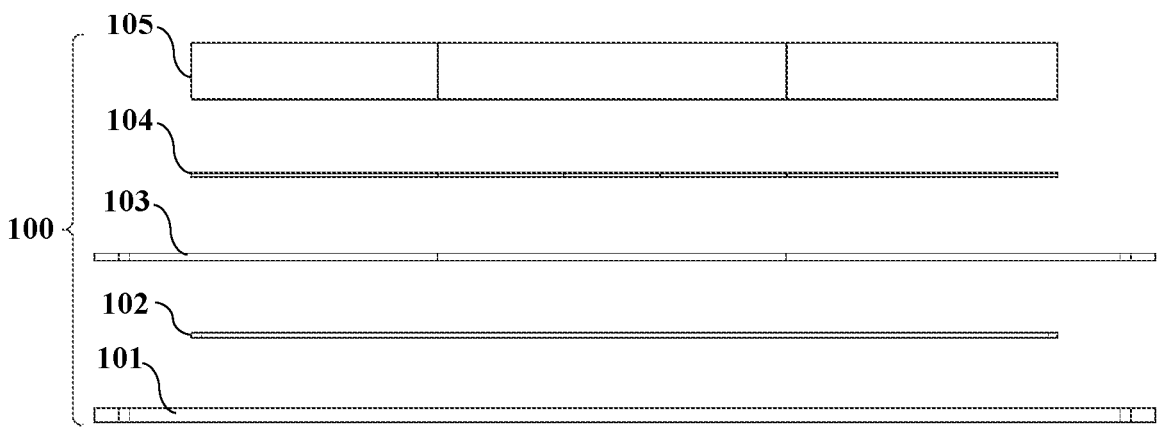
FIG. 1C illustrates an exploded, front elevation view of the embodiment of the multi-layered support surface assembly shown in FIG. 1A.
Figure 1D:
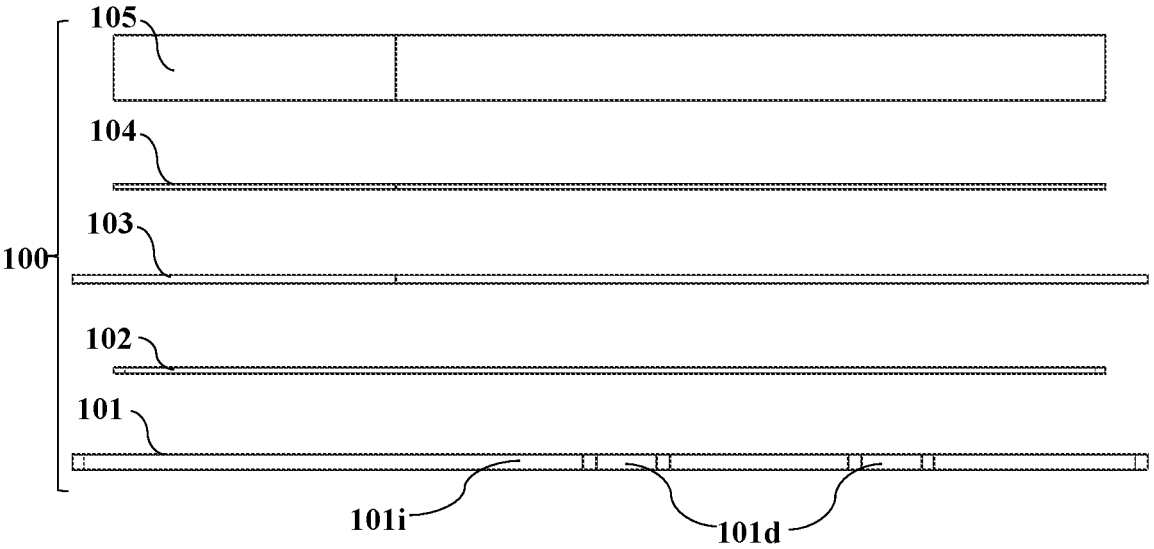
FIG. 1D illustrates an exploded, right-side elevation view of the embodiment of the multi-layered support surface assembly shown in FIG. 1A.

The base plate 101 is configured as a master plate to be secured to a support platform 802 of the 3D printer 801 illustrated in FIGS. 8A-8B. The base plate 101 is made, for example, from 13 gauge sheet metal. In an example, the length of the base plate 101 is about 7.01 inches, and the width of the base plate 101 is about 6.5 inches. The base plate 101 comprises a top surface 101*a* and a bottom surface 101*b*. In an embodiment, the base plate 101 is made of cold rolled steel. In another embodiment, the base plate 101 is made of hot rolled pickled and oiled (HRPO) steel. The base plate 101 comprises one or more mounting elements, for example, mounting holes 101*c*, and tabs 101*d* and 101*e* configured to facilitate securement of the base plate 101 to the support platform 802 of the 3D printer 801. In an embodiment as illustrated in FIGS. 1A-1B, the base plate 101 comprises two (2) generally circular mounting holes 101*c* and three (3) semi-hexagon-shaped tabs 101*d* and 101*e* configured to facilitate securement of the base plate 101 to the support platform 802 of the 3D printer 801. The two mounting holes 101*c* are disposed on opposing corners 101*f* and 101*g* of one side 101*h* of the base plate 101 as illustrated in FIG. 1B. FIGS. 1C-1D illustrate an exploded, front elevation view and an exploded, right-side elevation view, respectively, of the embodiment of the multi-layered support surface assembly 100 shown in FIG. 1A. In an embodiment as illustrated in FIGS. 1A-1B and FIG. 1D, two (2) of the semi-hexagon-shaped tabs 101*d* extend from one side 101*i* of the base plate 101, while one semi-hexagon-shaped tab 101*e* extends from an opposite side 101*j* of the base plate 101.

The sheet magnet layer 102 is disposed on the top surface 101*a* of the base plate 101. In an example, the thickness of the sheet magnet layer 102 is about 0.030 inch; the length of the sheet magnet layer 102 is about 6 inches; and the width of the sheet magnet layer 102 is about 6 inches. The sheet magnet layer 102 is, for example, a neodymium magnetic sheet. Examples of magnetic materials used for manufacturing the sheet magnet layer 102 comprise strontium ferrite (SrFe), barium ferrite (BaFe), neodymium iron boron (NdFeB), etc., or any suitable type of magnetic material that provides sufficient magnetic adhesive force to secure the upper plate 103 thereto. The sheet magnet layer 102 comprises a top magnetic surface 102*a* and a bottom adhesive surface 102*b*. In an example, the top magnetic surface 102*a* of the sheet magnet layer 102 is composed of magnetic materials such as neodymium, rare earth metals, samarium cobalt, aluminum nickel cobalt (AlNiCo), and ferrites. In an example, the bottom adhesive surface 102*b* of the sheet magnet layer 102 is composed of acrylic adhesives, two-component epoxy adhesives, etc., to provide an adhesive backing to the sheet magnet layer 102. The sheet magnet layer 102 is provided with the adhesive backing applied. The bottom adhesive surface 102*b* of the sheet magnet layer 102 is configured to be secured to the top surface 101*a* of the base plate 101.

Figure 3A:
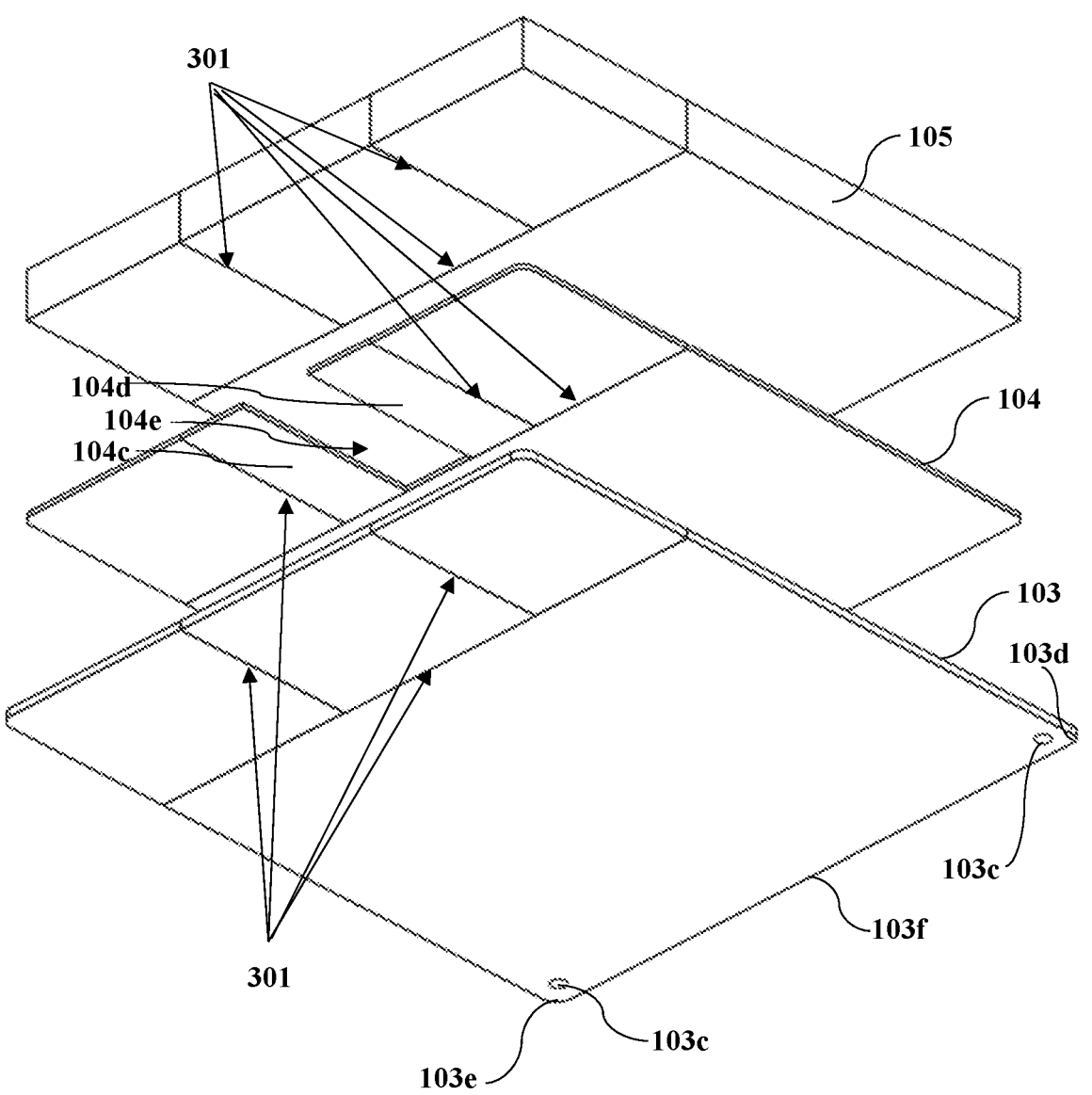
FIG. 3A illustrates an exploded, bottom perspective view of the embodiment of the multi-layered support surface assembly shown in FIG. 1A, showing three layers of the multi-layered support surface assembly.
Figure 3B:
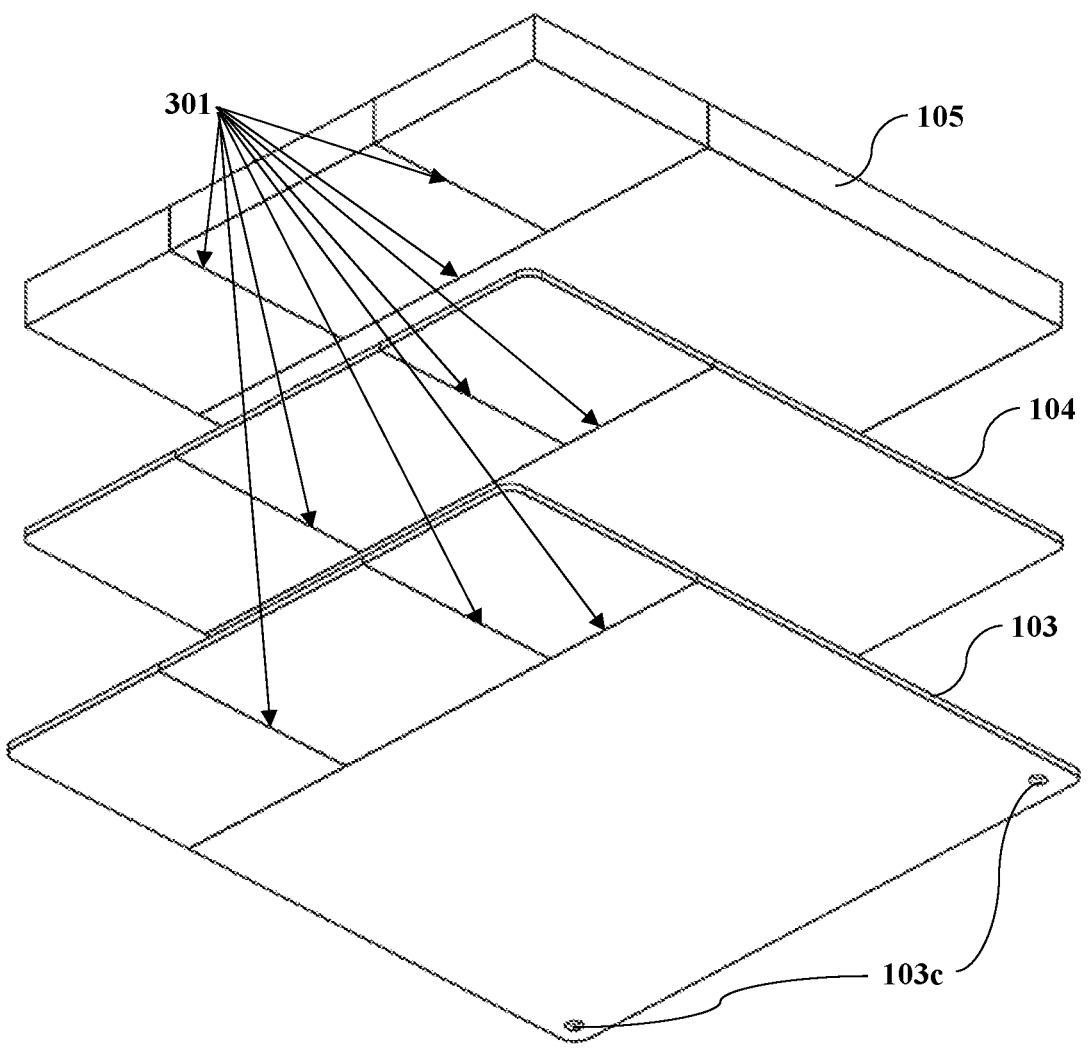
FIG. 3B illustrates an exploded, bottom perspective view showing an embodiment of an adhesive layer of the multi-layered support surface assembly.

The upper plate 103 is disposed on the top magnetic surface 102*a* of the sheet magnet layer 102. The upper plate 103 is located and magnetically attachable directly above the sheet magnet layer 102 on top of the base plate 101. The upper plate 103 is made, for example, from 18 gauge sheet metal. In an example, the length of the upper plate 103 is about 7.01 inches, and the width of the upper plate 103 is about 6.5 inches. In an embodiment, the upper plate 103 is made of cold rolled steel. In another embodiment, the upper plate 103 is made of hot rolled pickled and oiled (HRPO) steel. In an embodiment, the upper plate 103 is configured as a slave plate comprising a top surface 103*a* and a bottom surface 103*b*. The upper plate 103 further comprises one or more mounting elements, for example, mounting holes 103*c*, corresponding to the mounting element(s), for example, the mounting holes 101*c*, of the base plate 101. The mounting element(s) of the upper plate 103 are configured to facilitate securement of the upper plate 103 to the base plate 101. In an embodiment as illustrated in FIGS. 1A-1B and FIG. 3A, the upper plate 103 comprises two (2) generally circular mounting holes 103*c* configured to facilitate securement of the upper plate 103 to the base plate 101. The two mounting holes 103*c* are disposed on opposing corners 103*d* and 103*e* of one side 103*f* of the upper plate 103 as illustrated in FIGS. 3A-3B. The mounting holes 103*c* of the upper plate 103 are configured to be mutually aligned with the mounting holes 101*c* of the base plate 101 for facilitating the securement of the upper plate 103 to the base plate 101 using fasteners 804, for example, screws, bolts, etc., as illustrated in FIGS. 8A-8B. The upper plate 103 is configured to be secured to the sheet magnet layer 102 by a magnetic adhesive force of the top magnetic surface 102*a* of the sheet magnet layer 102. In an example, the sheet magnet layer 102 provides a magnetic adhesive force of about 400 grams per square centimeter (g/cm$^2$) for securing the upper plate 103 to the top magnetic surface 102*a* of the sheet magnet layer 102.

In an embodiment, the adhesive layer 104 is a double-sided, high-heat-resistant, adhesive tape comprising a top adhesive surface 104*a* and a bottom adhesive surface 104*b*. The adhesive layer 104 has a tolerance, for example, to about 190 degrees Celsius. The adhesive layer 104 is configured to provide a heat resistance of, for example, about 175 degrees Celsius to about 190 degrees Celsius. In an example, the length of the adhesive layer 104 is about 6 inches, and the width of the adhesive layer 104 is about 6 inches. Each of the top adhesive surface 104*a* and the bottom adhesive surface 104*b* of the adhesive layer 104 comprises an adhesive material protected by a backing element, for example, a paper backing (not shown). The adhesive layer 104 is a conformable foam tape, for example, a polyurethane foam tape, that offers high shear strength with a high temperature holding acrylic adhesive system for bonding to the upper plate 103 and the foam grow surface pad 105. In an example, the adhesive layer 104 is the 3M™ double coated urethane foam tape 4026 having a thickness of about 1.6 millimeters (mm), a short term temperature resistance of about 193 degrees Celsius, and a long term holding temperature of up to about 104.44 degrees Celsius. The adhesive layer 104 is disposed on the top surface 103*a* of the upper plate 103. The bottom adhesive surface 104*b* of the adhesive layer 104 is configured to be secured or adhered directly to the top surface 103*a* of the upper plate 103. The backing element (not shown) on the bottom adhesive surface 104*b* of the adhesive layer 104 is configured to be removed to expose the adhesive material and fasten the bottom adhesive surface 104*b* of the adhesive layer 104 to the top surface 103*a* of the upper plate 103.

In an embodiment, the foam grow surface pad 105 is a high-density, high-heat-resistant, foam grow surface pad comprising a top surface 105*a* and a bottom surface 105*b*. In an example, the thickness of the foam grow surface pad 105 is about 0.39 inch; the length of the foam grow surface pad 105 is about 6 inches; and the width of the foam grow surface pad 105 is about 6 inches. In an example, the foam grow surface pad 105 is a uniform polyurethane foam board with a density ranging from about 15 pounds per cubic foot (PCF) to about 20 PCF, a heat distortion temperature of about 112.78 degrees Celsius, a compressive strength of about 579 pounds per square inch (PSI) to about 968 PSI, and a shore D hardness or durometer (D) hardness of about 25 D to about 36 D. In an example, the foam grow surface pad 105 is LAST-A-FOAM® FR-7115 polyurethane foam of General Plastics Manufacturing Company. In another example, the foam grow surface pad 105 is LAST-A-FOAM® FR-7120 polyurethane foam of General Plastics Manufacturing Company. The foam grow surface pad 105 is configured to be secured to the top adhesive surface 104*a* of the adhesive layer 104. The backing element (not shown) on the top adhesive surface 104*a* of the adhesive layer 104 is configured to be removed to expose the adhesive material and fasten the bottom surface 105*b* of the foam grow surface pad 105 to the top adhesive surface 104*a* of the adhesive layer 104.

Figure 2:
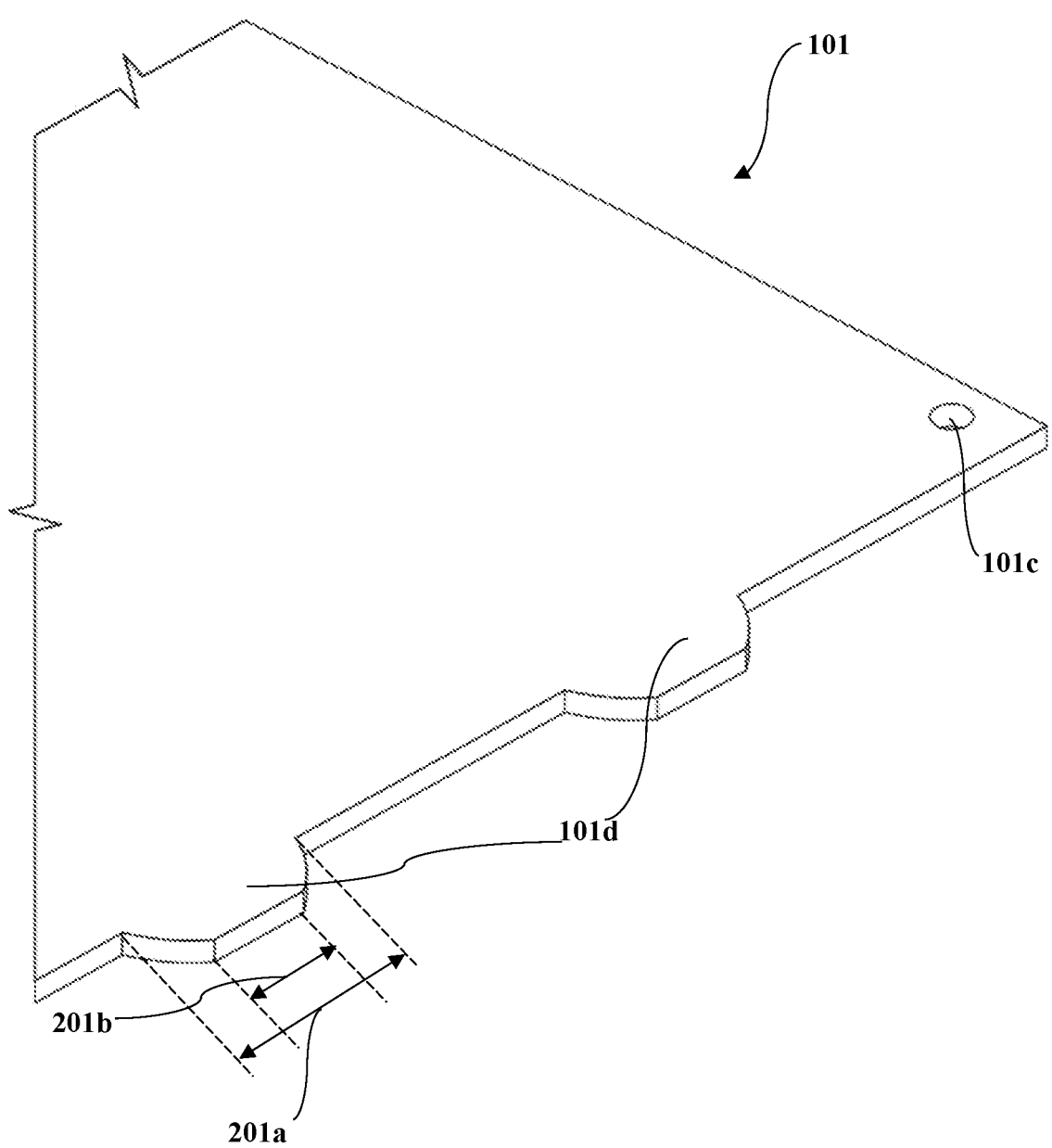
FIG. 2 illustrates a partial, enlarged, top perspective view of an embodiment of a base plate of the multi-layered support surface assembly shown in FIG. 1A.

FIG. 2 illustrates a partial, enlarged, top perspective view of an embodiment of the base plate 101 of the multi-layered support surface assembly 100 shown in FIG. 1A. In an embodiment, the base plate 101 comprises two (2) generally circular mounting holes 101*c* and three (3) semi-hexagon-shaped tabs 101*d* and 101*e* as illustrated in FIG. 1B, configured to facilitate securement of the base plate 101 to the support platform 802 of the three-dimensional (3D) printer 801 illustrated in FIGS. 8A-8B, as disclosed in the description of FIGS. 1A-1B. In an embodiment, the edges of the three (3) semi-hexagon-shaped tabs 101*d* and 101*e* are partially curved. The partial, enlarged, top perspective view illustrated in FIG. 2 shows one of the circular mounting holes 101*c* and two of the semi-hexagon-shaped tabs 101*d*. The diameter of each of the mounting holes 101*c* is, for example, about 0.85 inches. An outer length 201*a* of each of the tabs 101*d* is, for example, about 4.15 inches, and an inner length 201*b* of each of the tabs 101*d* is, for example, about 2.14 inches. The thickness of each of the tabs 101*d* is, for example, about 0.49 inches.

FIG. 3A illustrates an exploded, bottom perspective view of the embodiment of the multi-layered support surface assembly 100 shown in FIG. 1A, showing three layers 103, 104, and 105 of the multi-layered support surface assembly 100. The three layers shown in the exploded, bottom perspective view illustrated in FIG. 3A are the upper plate 103, the adhesive layer 104, and the foam grow surface pad 105 of the multi-layered support surface assembly 100. Also illustrated in FIG. 3A is the two (2) generally circular mounting holes 103*c* disposed on the opposing corners 103*d* and 103*e* of one side 103*f* of the upper plate 103. In an embodiment as illustrated in FIG. 3A, the adhesive layer 104 comprises multiple tape pieces, for example, two tape pieces 104*c* and 104*d* separated by a space 104*e*. Also illustrated in FIG. 3A, are approximate cut line locations 301 where the three layers 103, 104, and 105 of the multi-layered support surface assembly 100 are cut into removable sections as disclosed in the description of FIG. 6. The removable sections are cut in various configurations for removal of one or more completed objects without interrupting three-dimensional (3D) printing of taller layered objects that are still in progress. The foam grow surface pad 105, the adhesive layer 104, and the upper plate 103 are cut simultaneously into multiple removable sections based on the size and the shape of multiple objects that are 3D printed in a batch job, where each cut section with a completed object is removable for further processing by momentarily terminating the batch print process. After removal of the cut section with the completed object, the batch print process continues and the same cycle is repeated until all objects in the batch job are successfully printed.

FIG. 3B illustrates an exploded, bottom perspective view showing an embodiment of the adhesive layer 104 of the multi-layered support surface assembly 100. In this embodiment, the adhesive layer 104 is a continuous square-shaped layer of size, for example, about 6 inches long by about 6 inches wide, free of spaces as illustrated in FIG. 3B.

Figure 4A:
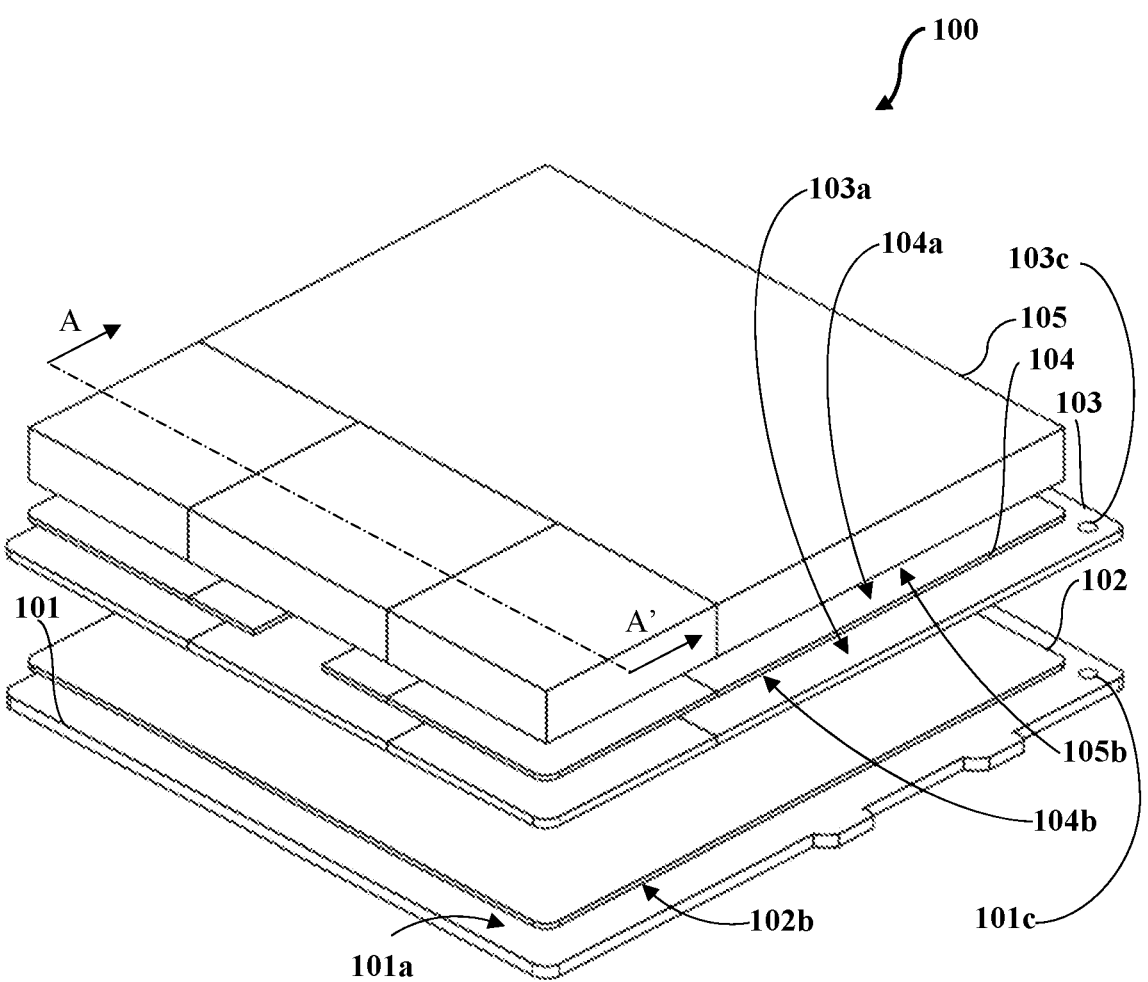
FIG. 4A illustrates a top perspective view of the embodiment of the multi-layered support surface assembly shown in FIG. 1A, showing partially assembled layers of the multi-layered support surface assembly.
Figure 4B:
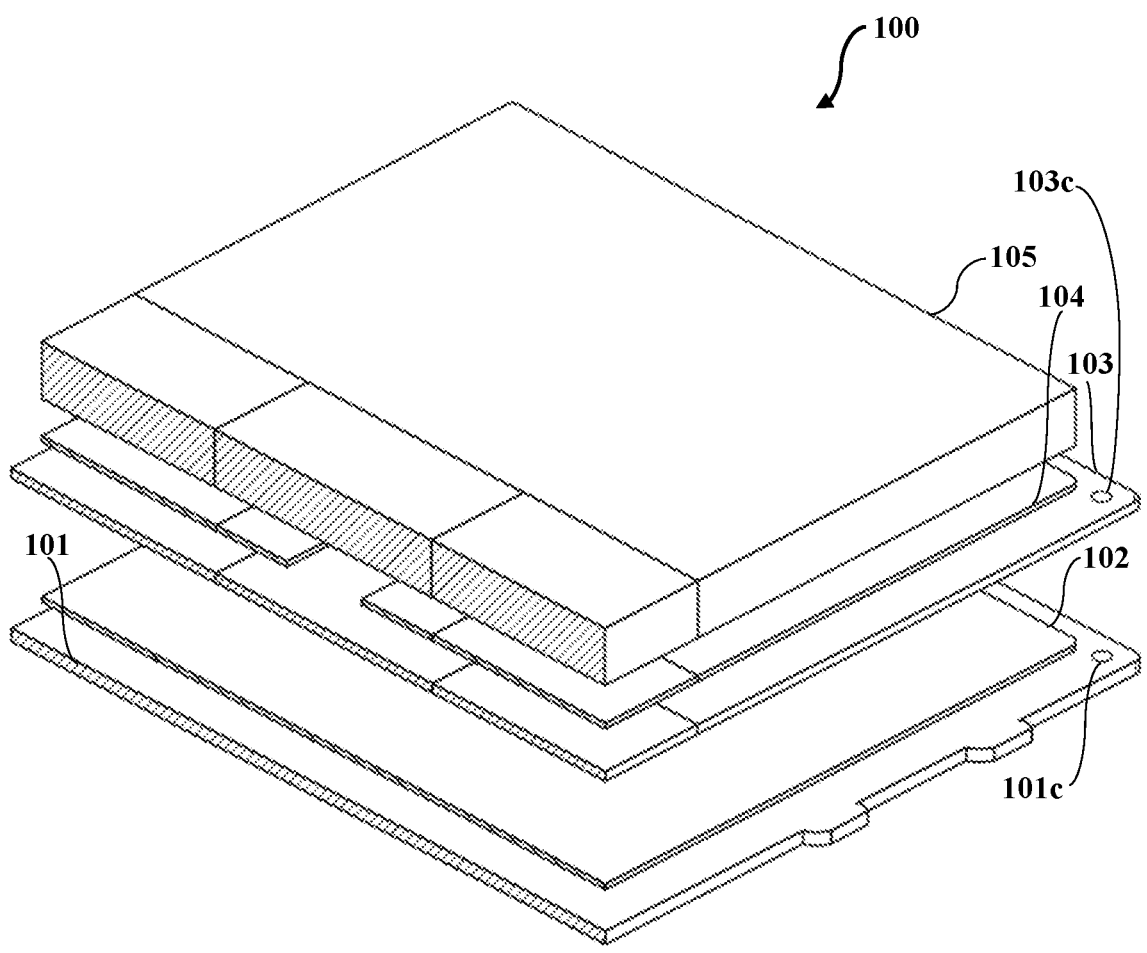
FIG. 4B illustrates a cross-sectional, top perspective view of the embodiment of the multi-layered support surface assembly shown in FIG. 1A, taken along a sectional line A-A' shown in FIG. 4A.

FIG. 4A illustrates a top perspective view of the embodiment of the multi-layered support surface assembly 100 shown in FIG. 1A, showing partially assembled layers 101, 102, 103, 104, and 105 of the multi-layered support surface assembly 100. As illustrated in FIG. 4A, the bottom adhesive surface 102*b* of the sheet magnet layer 102 is secured to the top surface 101*a* of the base plate 101. In an embodiment, the partially assembled, multi-layered support surface assembly 100 illustrated in FIG. 4A, is provided to a buyer ready for use. In the ready to use condition, the base plate 101 is provided along with the sheet magnet layer 102 applied on the top surface 101*a* of the base plate 101. FIG. 4B illustrates a cross-sectional, top perspective view of the embodiment of the multi-layered support surface assembly 100 shown in FIG. 1A, taken along a sectional line A-A' shown in FIG. 4A. The mounting holes 103*c* of the upper plate 103 are aligned with the mounting holes 101*c* of the base plate 101 for facilitating securement of the upper plate 103 to the base plate 101, with the sheet magnet layer 102 sandwiched between the upper plate 103 and the base plate 101. The magnetic force of the sheet magnet layer 102 secures the upper plate 103 to the base plate 101. The bottom adhesive surface 104*b* of the adhesive layer 104 is secured to the top surface 103*a* of the upper plate 103. The bottom surface 105*b* of the foam grow surface pad 105 is secured to the top adhesive surface 104*a* of the adhesive layer 104.

Figure 5B:
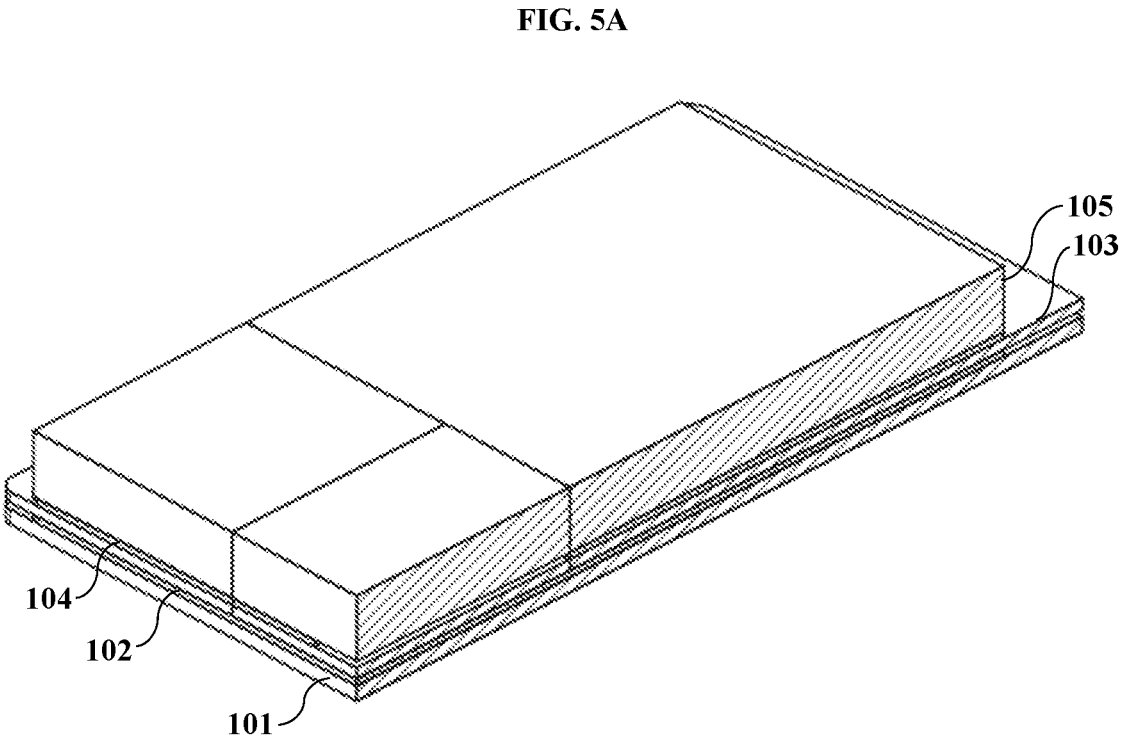
FIG. 5B illustrates a cross-sectional, top perspective view of the embodiment of the multi-layered support surface assembly shown in FIG. 1A, taken along a sectional line B-B' shown in FIG. 5A.

FIG. 5A illustrates a top perspective view of the embodiment of the multi-layered support surface assembly 100 shown in FIG. 1A, showing assembled layers 101, 102, 103, 104, and 105 of the multi-layered support surface assembly 100. FIG. 5B illustrates a cross-sectional, top perspective view of the embodiment of the multi-layered support surface assembly 100 shown in FIG. 1A, taken along a sectional line B-B' shown in FIG. 5A. As illustrated in FIGS. 5A-5B, the sheet magnet layer 102 is secured to the top surface 101*a* of the base plate 101; the upper plate 103 is secured to the top surface 102*a* of the sheet magnet layer 102; the adhesive layer 104 secured to the top surface 103*a* of the upper plate 103; and the foam grow surface pad 105 is secured to the top surface 104*a* of the adhesive layer 104, where the top surfaces 101*a*, 102*a*, 103*a*, and 104*a* of the layers 101, 102, 103, and 104, respectively, are illustrated in FIGS. 1A-1B.

Figure 6:
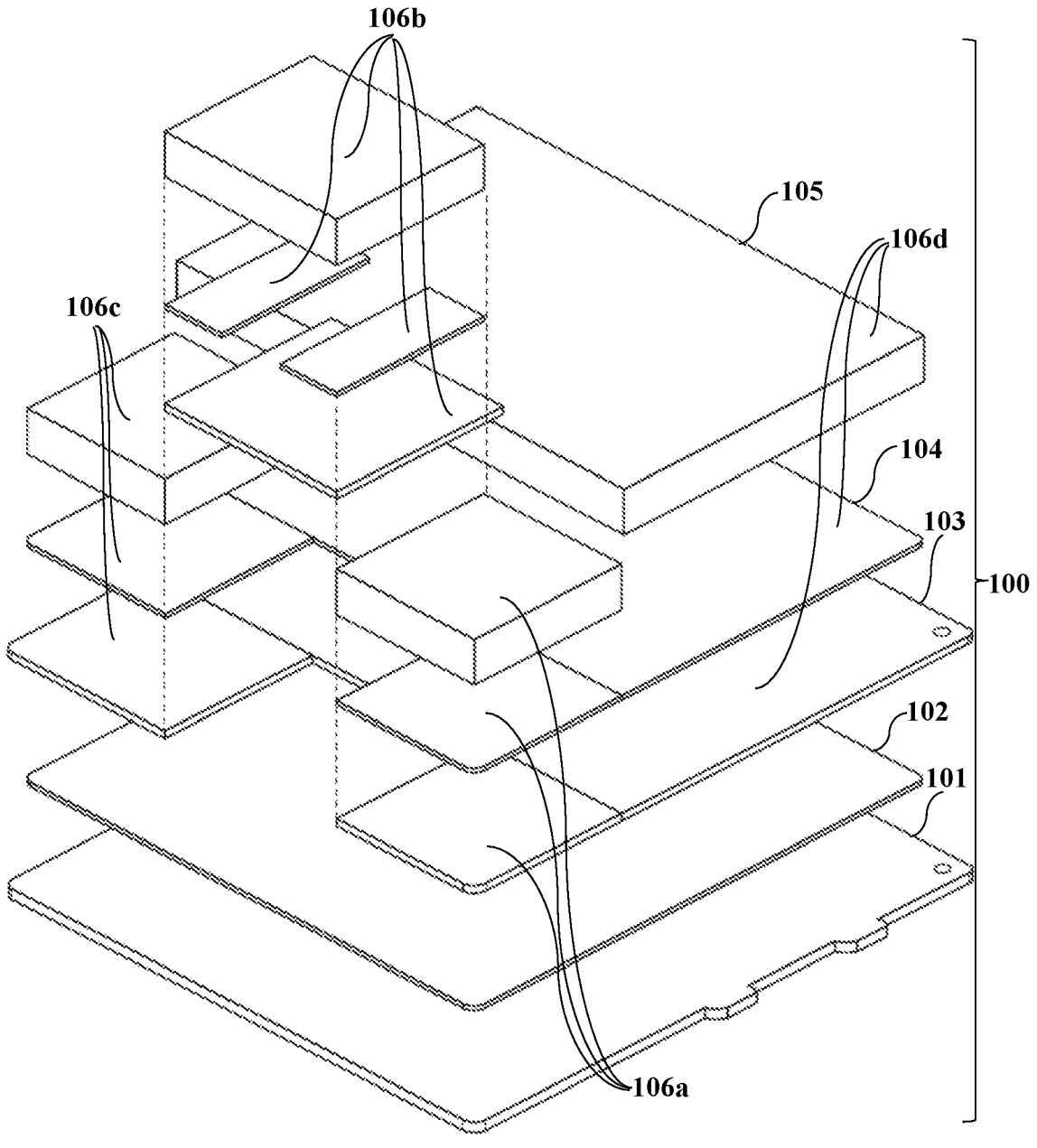
FIG. 6 illustrates an exploded, top perspective view of the embodiment of the multi-layered support surface assembly shown in FIG. 1A, showing an upper plate, an adhesive layer, and a foam grow surface pad of the multi-layered support surface assembly in a disassembled state.

FIG. 6 illustrates an exploded, top perspective view of the embodiment of the multi-layered support surface assembly 100 shown in FIG. 1A, showing the upper plate 103, the adhesive layer 104, and the foam grow surface pad 105 of the multi-layered support surface assembly 100 in a disassembled state. The foam grow surface pad 105 together with the upper plate 103 secured thereto by the adhesive layer 104 is cut into multiple removable sections 106a, 106b, 106c, and 106d of preselected configurations based on size and shape of multiple objects to be three-dimensionally printed thereon. A cutting device, for example, an industrial vertical band saw, is used for creating the removable sections 106a, 106b, 106c, and 106d of preselected configurations. On completion of one or more of the objects built on one or more of the removable sections 106a, 106b, 106c, and 106d by the three-dimensional (3D) printer 801 illustrated in FIGS. 8A-8B, the removable section(s), for example, 106a, with the built object(s) is configured to be lifted off the sheet magnet layer 102 and removed from the base plate 101 for further processing, without disturbing positions of incomplete objects being built on the other removable sections, for example, 106b, 106c, and 106d.

In an embodiment, the base plate 101 and the upper plate 103 are provided with user instructions for optimizing design placement, object placement, and object building for early removal of the completed objects on the removable sections while the incomplete objects continue to be built on the other removable sections without disruption.

Figure 7A:
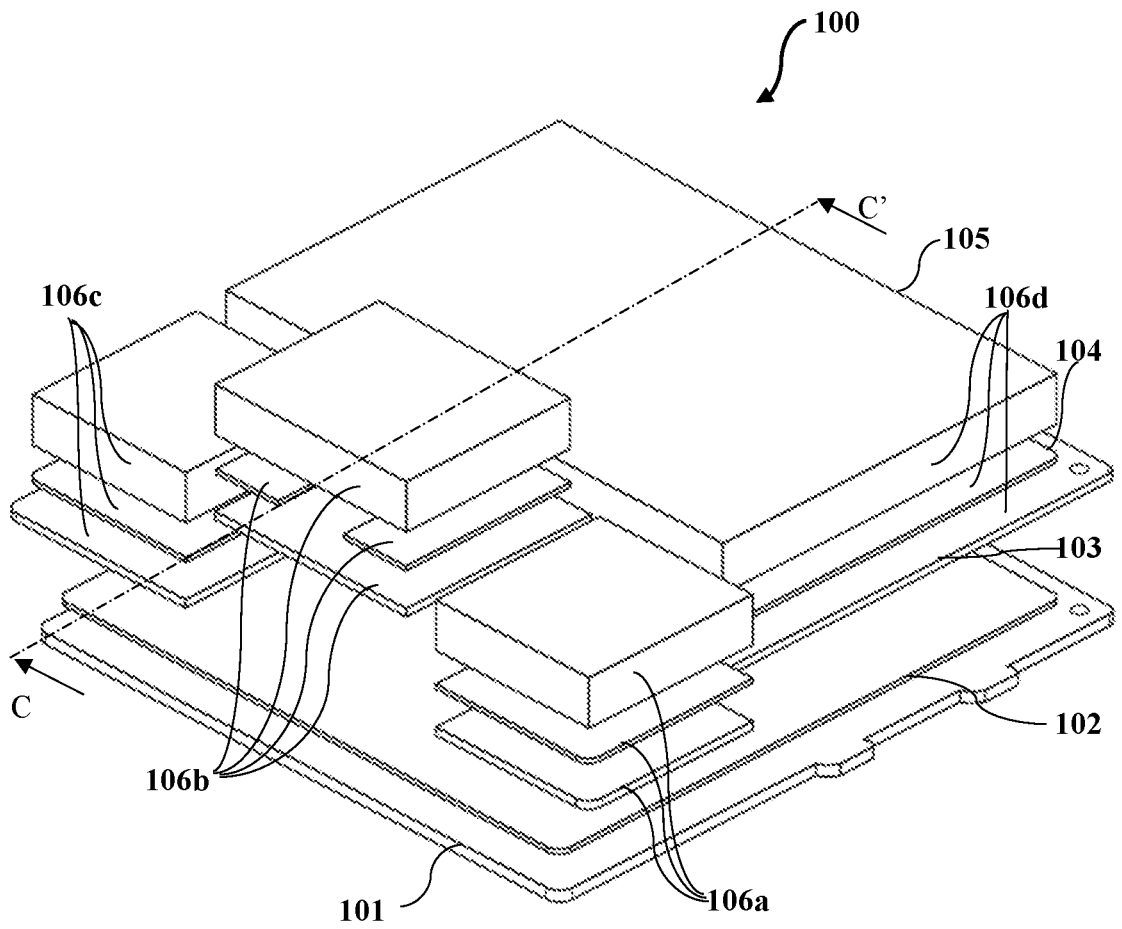
FIG. 7A illustrates a top perspective view of the embodiment of the multi-layered support surface assembly shown in FIG. 1A, showing the foam grow surface pad together with the upper plate secured thereto by the adhesive layer cut into multiple removable sections of preselected configurations based on size and shape of multiple objects to be three-dimensionally printed thereon.
Figure 7B:
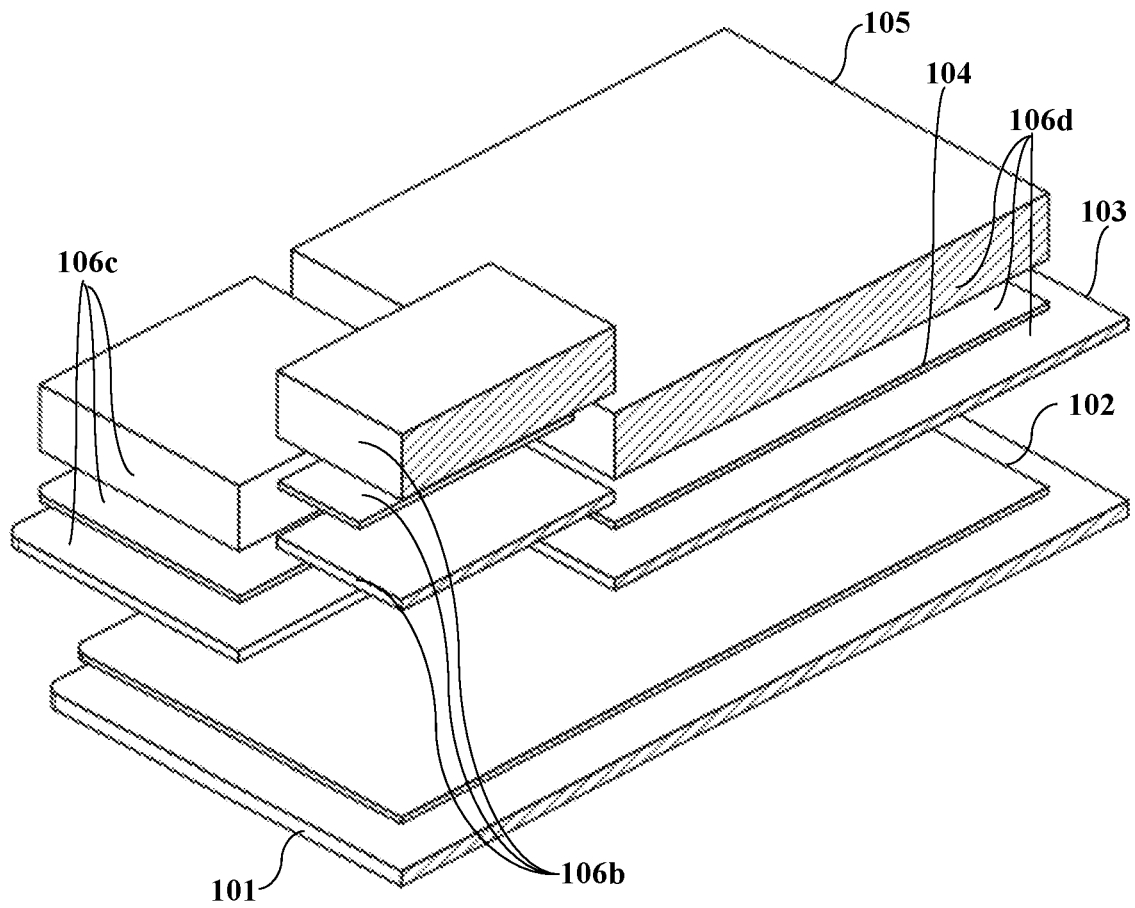
FIG. 7B illustrates a cross-sectional, top perspective view of the embodiment of the multi-layered support surface assembly shown in FIG. 1A, taken along a sectional line C-C' shown in FIG. 7A.

FIG. 7A illustrates a top perspective view of the embodiment of the multi-layered support surface assembly 100 shown in FIG. 1A, showing the foam grow surface pad 105 together with the upper plate 103 secured thereto by the adhesive layer 104 cut into multiple removable sections 106a, 106b, 106c, and 106d of preselected configurations based on size and shape of multiple objects to be three-dimensionally printed thereon. FIG. 7A shows the removable sections 106a, 106b, 106c, and 106d slightly moved from a ready position to indicate their removability function. FIG. 7B illustrates a cross-sectional, top perspective view of the embodiment of the multi-layered support surface assembly 100 shown in FIG. 1A, taken along a sectional line C-C' shown in FIG. 7A.

FIGS. 8A-8B illustrate top perspective views of the embodiment of the multi-layered support surface assembly 100 shown in FIG. 1A, secured to a support platform 802 of a three-dimensional (3D) printer 801. The assembled multi-layered support surface assembly 100 is disposed on the support platform 802 of the 3D printer 801, such that the bottom surface 101b of the base plate 101 lies flat against the support platform 802. Fasteners 804, for example, bolts, are inserted into the mutually aligned mounting holes 103c and 101c of the upper plate 103 and the base plate 101 of the assembled multi-layered support surface assembly 100, respectively, as illustrated in FIGS. 4A-4B and FIG. 5A, to secure the upper plate 103 to the base plate 101 on the support platform 802 of the 3D printer 801. The 3D printer 801 comprises securing units, for example, sliding clamps 803a and 803b, connected to opposing sides 801a and 801b of the 3D printer 801. The sliding clamps 803a and 803b are configured to slide over and clamp the tabs 101d and 101e of the base plate 101, respectively, illustrated in FIG. 1B and FIG. 8A, to secure the base plate 101 to the support platform 802 as illustrated in FIG. 8B. An operator of the 3D printer 801 may then initiate the 3D printing process to three-dimensionally print multiple objects onto the removable sections 106 of the assembled and secured multi-layered support surface assembly 100 using a print head 805 of the 3D printer 801 as disclosed in the description of FIG. 12.

The multi-layered support surface assembly 100 forms a base on which the print head 805 begins a layering upon layering of molten build and support materials to form a three-dimensional object or model. The 3D object is built or grown from the bottom to the top and is positioned within X and Y coordinates or on the overall defined area of the foam grow surface pad 105 of the multi-layered support surface assembly 100. The multi-layered support surface assembly 100 incorporates safely removable sections 106 as disclosed in the descriptions of FIG. 6, FIG. 9, and FIGS. 10A-10B. The multi-layered support surface assembly 100 provides a safe method for removing completed 3D objects from its build or grow support surface without disturbing the exact positioning of taller layered 3D objects until the taller layered 3D objects complete their respective builds. By allowing the removal of the 3D objects as they complete, the multi-layered support surface assembly 100 ensures timely completion of multiple build projects in a batch process and in turn, timely delivery of the built 3D objects to clients. The multi-layered support surface assembly 100 allows removal of the removable sections 106 with the completed 3D objects until the build of the tallest layered 3D object, that is, the 3D object with the longest projected build time, is complete, thereby allowing the operator of the 3D printer 801 to performing subsequent product processes for the completed shorter layered 3D objects, without having to wait until the tallest layered 3D object is complete.

Figure 9:
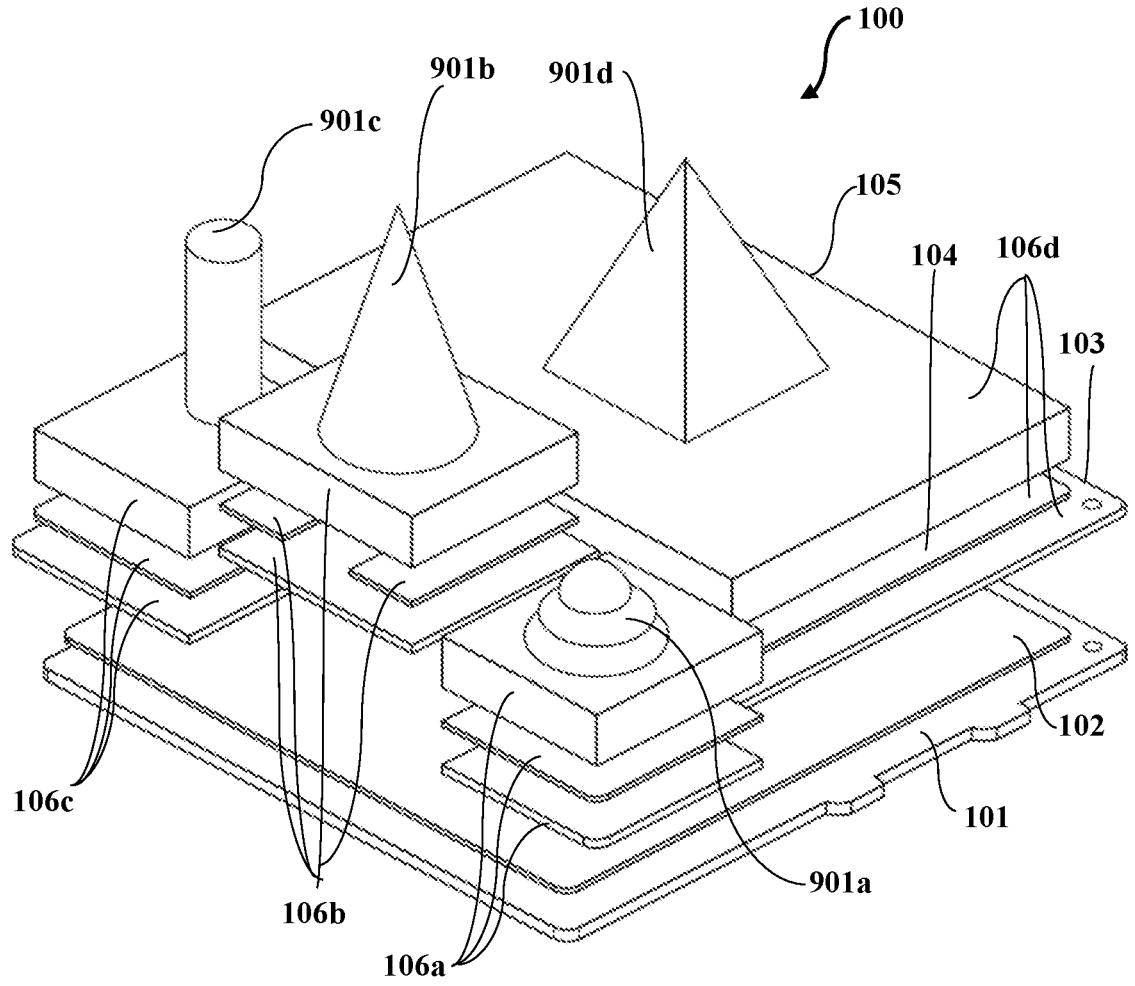
FIG. 9 illustrates a top perspective view of the embodiment of the multi-layered support surface assembly shown in FIG. 1A, showing disassembled removable sections of the multi-layered support surface assembly with multiple objects three-dimensionally printed by a 3D printer thereon.

FIG. 9 illustrates a top perspective view of the embodiment of the multi-layered support surface assembly 100 shown in FIG. 1A, showing disassembled removable sections 106a, 106b, 106c, and 106d of the multi-layered support surface assembly 100 with multiple objects 901a, 901b, 901c, and 901d three-dimensionally printed by a three-dimensional (3D) printer 801 shown in FIGS. 8A-8B, thereon. The 3D printer 801 is configured to print multiple objects 901a, 901b, 901c, and 901d of different shapes and sizes on corresponding removable sections 106a, 106b, 106c, and 106d of associated shapes and sizes of the multi-layered support surface assembly 100. For example, the 3D printer 801 is configured to print objects 901a, 901b, 901c, and 901d of spherical shapes, conical shapes, cylindrical shapes, square-based and triangular-based pyramidal shapes, triangular prism shapes, etc., on corresponding removable sections 106a, 106b, 106c, and 106d of associated shapes and sizes of the multi-layered support surface assembly 100. The multi-layered support surface assembly 100 allows for building of multiple objects 901a, 901b, 901c, and 901d of different heights, where removable sections, for example, 106a and 106c, containing shorter layered objects, for example, 901a and 901c, are removed as they complete, while taller layered 3D objects, for example, 901b and 901d, continue being built on the other removable sections, for example, 106b and 106d, of the multi-layered support surface assembly 100.

FIG. 10A illustrates a top perspective view of the embodiment of the multi-layered support surface assembly 100 shown in FIG. 1A, showing assembled removable sections 106a, 106b, 106c, and 106d of the multi-layered support surface assembly 100 with multiple objects 1001a, 1001b, 1001c, and 1001d three-dimensionally printed by the three-dimensional (3D) printer 801 shown in FIGS. 8A-8B, thereon. The individual sections 106a, 106b, 106c, and 106d are removable from the base plate 101 of the multi-layered support surface assembly 100.

FIG. 10B illustrates a top perspective view of the embodiment of the multi-layered support surface assembly 100 shown in FIG. 1A, showing removal of one of the assembled removable sections, for example, 106a, of the multi-layered support surface assembly 100 with a completely built, shorter layered object, for example, 1001a, from the sheet magnet layer 102 and in turn, from the base plate 101 of the multi-layered support surface assembly 100 for further processing, without disturbing positions of incomplete objects, for example, 1001*b*, 1001*c*, and 1001*d*, being built on other removable sections 106*b*, 106*c*, and 106*d*, respectively. Each of the removable sections 106*a*, 106*b*, 106*c*, and 106*d* comprises a portion of the three layers, that is, the upper plate 103, the adhesive layer 104, and the foam grow surface pad 105 of the multi-layered support surface assembly 100 illustrated in FIG. 6. The adhesive layer 104 keeps the upper plate 103 and the foam grow surface pad 105 together for removal and processing of the completed objects or finished builds, while the base plate 101 stays in place on the support platform 802 of the three-dimensional (3D) printer 801 illustrated in FIGS. 8A-8B. The positioning of the foam grow surface pad 105 on the upper plate 103 via the adhesive layer 104, instead of on the base plate 101 allows the base plate 101 to remain intact with the attached sheet magnet layer 102 on the support platform 802 of the 3D printer 801 to allow for optimal alignment and completion of the incomplete objects or unfinished builds.

Figure 11:
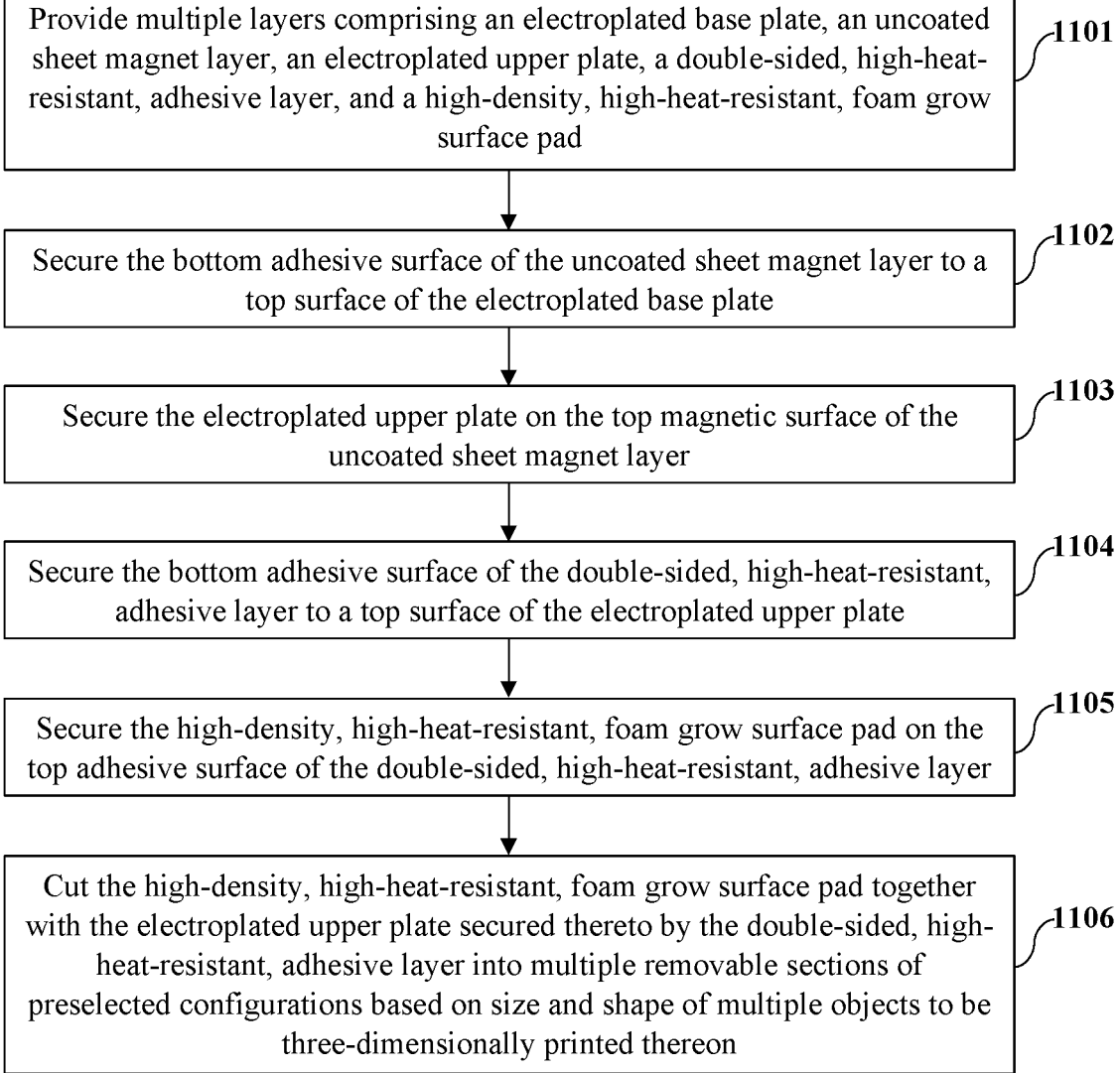
FIG. 11 illustrates a flowchart of an embodiment of a method for assembling a multi-layered support surface assembly.

FIG. 11 illustrates a flowchart of an embodiment of a method for assembling a multi-layered support surface assembly 100 shown in FIG. 5A. In the method disclosed herein, multiple layers, namely, an electroplated base plate 101, an uncoated sheet magnet layer 102, an electroplated upper plate 103, a double-sided, high-heat-resistant, adhesive layer 104, and a high-density, high-heat-resistant, foam grow surface pad 105 as illustrated in FIGS. 1A-1D and as disclosed in the descriptions of FIGS. 1A-10B, are provided 1101. The method disclosed herein comprises securing 1102 or adhering the bottom adhesive surface 102*b* of the uncoated sheet magnet layer 102 to the top surface 101*a* of the electroplated base plate 101; securing 1103 the electroplated upper plate 103 on the top magnetic surface 102*a* of the uncoated sheet magnet layer 102 using a magnetic force of the top magnetic surface 102*a* of the uncoated sheet magnet layer 102; securing 1104 the bottom adhesive surface 104*b* of the double-sided, high-heat-resistant, adhesive layer 104 to the top surface 103*a* of the electroplated upper plate 103; securing 1105 the high-density, high-heat-resistant, foam grow surface pad 105 on the top adhesive surface 104*a* of the double-sided, high-heat-resistant, adhesive layer 104; and cutting 1106 the high-density, high-heat-resistant, foam grow surface pad 105 together with the electroplated upper plate 103 secured thereto by the double-sided, high-heat-resistant, adhesive layer 104 into multiple removable sections 106*a*, 106*b*, 106*c*, and 106*d* of preselected configurations based on size and shape of multiple objects 1001*a*, 1001*b*, 1001*c*, and 1001*d* illustrated in FIG. 10A, to be three-dimensionally printed thereon.

Disclosed below is an exemplary method for assembling the multi-layered support surface assembly 100 as a versatile grow plate for high quality three-dimensional (3D) printing.

1) A cold rolled steel base plate 101 made from 13 gauge sheet metal that comprises mounting holes 101*c* for secure placement of the base plate 101 on the support platform 802 of the 3D printer 801 illustrated in FIGS. 8A-8B, and tabs 101*d* and 101*e* that provide a hold down structure for the sliding clamps 803*a* and 803*b* to secure the base pate 101 to the 3D printer 801, is provided. The base plate 101 measures about 7.01 inches long by about 6.5 inches wide. In an embodiment, the base plate 101 is made from a hot rolled pickled and oiled (HRPO) steel material.

2) An uncoated, sheet magnet layer 102 with an adhesive material on one surface, that is, the bottom surface

102*b*, and measuring about 6 inches long by about 6 inches wide with a thickness of about 0.030 inch, is applied to the top surface 101*a* of the base plate 101 by removing a protective paper backing that covers the adhesive material on the bottom surface 102*b* of the sheet magnet layer 102.

3) A cold rolled steel upper plate 103 made from 18 gauge sheet metal that comprises mounting holes 103*c* for secure placement over the top of the base plate 101, is provided. The upper plate 103 is made without tabs since the sheet magnet layer 102 allows a more than sufficient secure placement on top of the base plate 101. The upper plate 103 measures about 7.01 inches long by about 6.5 inches wide. In an embodiment, the upper plate 103 is made from a hot rolled pickled and oiled (HRPO) steel material. The base plate 101 and the upper plate 103 are electroplated to protect the finish of both the base plate 101 and the upper plate 103.

4) A double-sided, high-heat-resistant, adhesive tape with a tolerance to about 190 degrees Celsius with an approximate size of about 6 inches long by about 6 inches wide is cut from a supplied roll to form the adhesive layer 104. The adhesive layer 104 is applied to the top surface 103*a* of the upper plate 103 by removing the protective paper backing that covers the adhesive material on one surface 104*b* of the adhesive layer 104. The double-sided, high-heat-resistant, adhesive layer 104 provides improved quality and heat resistance and is placed upon the upper plate 103 instead of on the base plate 101.

5) A high-density, high-heat-resistant, 10-millimeter (mm) thick foam grow surface pad 105 measuring about 6 inches long by about 6 inches wide is applied to the double-sided, high-heat-resistant, adhesive layer 104, previously installed to the top surface 103*a* of the upper plate 103. The protective paper backing that covers the top adhesive surface 104*a* of the double-sided, high-heat-resistant, adhesive layer 104 is removed for the secure placement of the foam grow surface pad 105 thereon. The high-density, high-heat-resistant, foam grow surface pad 105, which is positioned on the upper plate 103 via the adhesive layer 104, instead of on the base plate 101, provides an additional thickness, life cycle, and durability to the multi-layered support surface assembly 100.

6) At this stage of the assembly process, by utilizing an industrial vertical band saw, the foam grow surface pad 105 along with the upper plate 103 secured thereto by the adhesive layer 104 is cut into removable sections 106*a*, 106*b*, 106*c*, and 106*d* of the overall grow plate footprint depending on the sizes required for specific objects offered and sold for use. The foam grow surface pad 105 along with the upper plate 103 secured thereto by the adhesive layer 104 is cut into removable sections 106*a*, 106*b*, 106*c*, and 106*d* of exacting shapes and sizes to accommodate the profiles selected by a buyer. The foam grow surface pad 105 along with the upper plate 103 secured thereto by the adhesive layer 104 is cut into removable sections 106*a*, 106*b*, 106*c*, and 106*d* of different configurations depending on the buyer's needs.

Upon completion of the cutting operation, the multi-layered support surface assembly product is cleaned and packaged for shipment to the buyer. The base plate 101 and the upper plate 103 are provided with complete user instructions for maximizing design placement and object building for early removal of completed object builds while taller layered objects continue to build without disruption.

Figure 12:
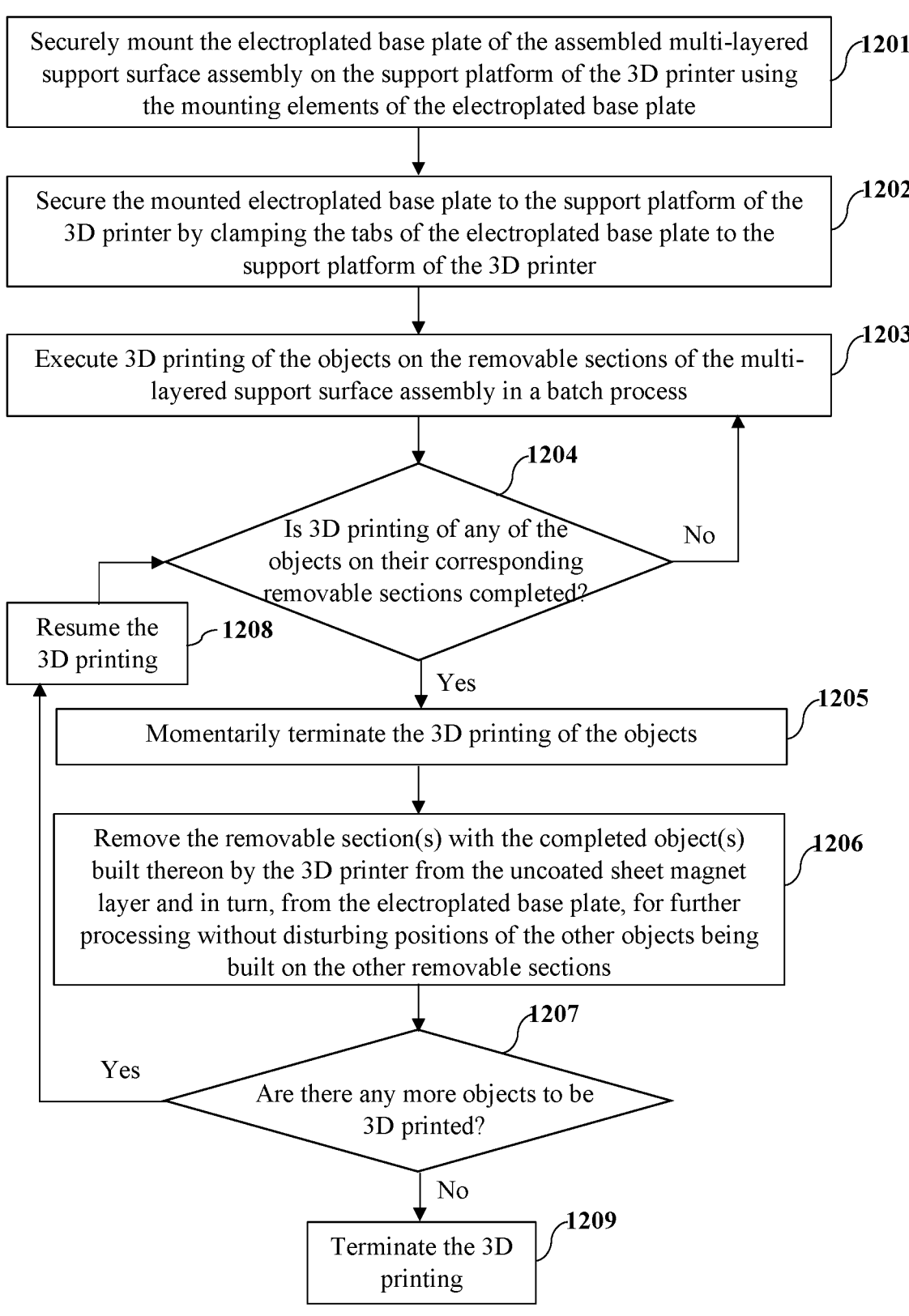
FIG. 12 illustrates a flowchart of an embodiment of a method for executing 3D printing of multiple objects on the removable sections of the multi-layered support surface assembly by a 3D printer in a batch process.

FIG. 12 illustrates a flowchart of an embodiment of a method for executing three-dimensional (3D) printing of multiple objects 1001a, 1001b, 1001c, and 1001d on the removable sections 106a, 106b, 106c, and 106d of the multi-layered support surface assembly 100, respectively, shown in FIGS. 10A-10B, by a three-dimensional (3D) printer 801 shown in FIGS. 8A-8B, in a batch process. As used herein, "batch process" refers to a process of three-dimensionally printing multiple 3D objects in a single batch. In an embodiment, the multi-layered support surface assembly 100 is secured to the 3D printer 801 by securely mounting 1201 the electroplated base plate 101 of the assembled multi-layered support surface assembly 100 on the support platform 802 of the 3D printer 801 using the mounting elements, for example, the mounting holes 101c, of the electroplated base plate 101; and securing 1202 the mounted electroplated base plate 101 to the support platform 802 of the 3D printer 801 by clamping the tabs 101d and 101e of the electroplated base plate 101 to the support platform 802 of the 3D printer 801 using the sliding clamps 803a and 803b illustrated in FIGS. 8A-8B. The method disclosed herein further comprises: (a) executing 3D printing 1203 of the objects 1001a, 1001b, 1001c, and 1001d on the removable sections 106a, 106b, 106c, and 106d of the multi-layered support surface assembly 100, respectively, by the 3D printer 801 in a batch process; (b) on completing the 3D printing of one or more of the objects, for example, 1001a, built on one or more of the removable sections, for example, 106a, by the 3D printer 801, momentarily terminating 1205 the 3D printing of the objects 1001a, 1001b, 1001c, and 1001d; (c) removing 1206 the removable section (s) 106a with the object(s) 1001a built thereon by the 3D printer 801 from the uncoated sheet magnet layer 102 and in turn, from the electroplated base plate 101 as illustrated in FIG. 10B, for further processing without disturbing positions of the other objects 1001b, 1001c, and 1001d being built on the other removable sections 106b, 106c, and 106d, respectively; (d) resuming the 3D printing 1208 of the other objects 1001b, 1001c, and 1001d on the other removable sections 106b, 106c, and 106d, respectively, by the 3D printer 801; and (e) repeating the steps (b), (c), and (d) until the 3D printing of all the objects 1001b, 1001c, and 1001d is completed. If there are no more objects to be 3D printed 1207, the 3D printed process is terminated 1209.

In the method disclosed above, if 3D printing of any of the objects 1001a, 1001b, 1001c, and 1001d on their respective removable sections 106a, 106b, 106c, and 106d is completed 1204, the 3D printer 801 momentarily terminates 1205 the 3D printing of the objects 1001a, 1001b, 1001c, and 1001d to allow removal 1206 of the removable section (s) 106a with the completed object(s) 1001a built thereon by the 3D printer 801 from the uncoated sheet magnet layer 102 and in turn, from the electroplated base plate 101 for further processing without disturbing positions of the other objects 1001b, 1001c, and 1001d being built on the other removable sections 106b, 106c, and 106d. An operator pauses the 3D printer 801 when a shorter layered object is complete, due to which the print head 805 illustrated in FIGS. 8A-8B moves to a parked position, allowing access to the removable sections 106a, 106b, 106c, and 106d of the multi-layered support surface assembly 100. The operator then safely removes the section(s), for example, 106a, with the completed object(s), for example, 1001a, from the 3D printer 801 and places the section(s) 106a on a heating device, for example, a hot plate, in about less than 5 seconds. A temperature of, for example, about 145 degrees Celsius, is required to remove the completed object(s) 1001a from the removable section(s) 106a on the hot plate. When the completed object(s) 1001a is removed from the corresponding removable section(s) 106a after heating by the heating device, the removable section(s) 106a may be repositioned on the sheet magnet layer 102 and in turn on the electroplated base plate 101 and reused for 3D printing of other objects thereon.

After removing the removable section(s) 106a with the completed object(s) 1001a built thereon by the 3D printer 801 from the electroplated base plate 101, if there are any more objects to be 3D printed 1207, the 3D printer 801 resumes the 3D printing 1208 or building of the other objects, for example, the taller layered objects 1001b, 1001c, and 1001d, on the other removable sections 106b, 106c, and 106d and repeats the steps 1204, 1205, and 1206 until there are no more objects to be 3D printed. If there are no more objects to be 3D printed 1207, the 3D printer 801 terminates 1209 the 3D printing. By the incorporation of the removable sections 106a, 106b, 106c, and 106d, the multi-layered support surface assembly 100 overcomes the inherent limitation of a conventional one-piece build or grow support surface and allows the removal of completed, shorter layered objects, thereby facilitating the next steps in processing to occur substantially sooner than those facilitated with the conventional one-piece build or grow support surface. The multi-layered support surface assembly 100 allows quick finishing of shorter layered 3D objects and allows the operator of the 3D printer 801 greater flexibility in design, scheduling, and efficiency, and less frequent replacement of the build or grow support surface.

The multi-layered support surface assembly 100 provides safely removable sections 106a, 106b, 106c, and 106d for optimizing the 3D printing process. The 3D printer 801 is paused for a few seconds to allow easy lifting of the individual removable sections 106a, 106b, 106c, and 106d of the multi-layered support surface assembly 100. The removable sections 106a, 106b, 106c, and 106d with the completed objects 1001a, 1001b, 1001c, and 1001d, respectively, are removed from the 3D printer 801 and placed on the heating device, for example, the hot plate, for removal and subsequent processing of the completed objects 1001a, 1001b, 1001c, and 1001d. The 3D printer 801 is then resumed to continue the growing or building process for the unfinished or incomplete taller layered objects. The operator of the 3D printer 801 can select removable sections 106a, 106b, 106c, and 106d of the multi-layered support surface assembly 100 for placing shorter layered objects thereon for substantially earlier removal. The ability to remove sections 106a, 106b, 106c, and 106d of the multi-layered support surface assembly 100 with the completed objects 1001a, 1001b, 1001c, and 1001d, respectively, for further processing provide flexibility to design and schedule production runs where a designer can ascertain the time for completing shorter layered objects, thereby allowing client deliveries ahead of schedule and earlier problem resolution, without disturbing the building of the taller layered objects. The multi-layered support surface assembly 100 provides a sectional, removeable build surface for 3D printers.

The use of the multi-layered support surface assembly 100 on the 3D printer 801 provides the operator of the 3D printer 801 with a more productive means for scheduling and processing shorter layered 3D printed objects; placing completed objects into subsequent processes substantially sooner; allowing the meeting of deadlines for product turnover to clients; reducing canceled orders and loss of business; and increasing production efficiency by reducing wait time, providing additional time for problem resolution, and providing flexibility in the number of build projects to place for simultaneous manufacturing, and by the extended life of the multi-layered support surface assembly 100. The multi-layered support surface assembly 100 provides increased design and production efficiency to the high quality 3D manufacturing industry by enabling the removal of objects upon completion, via the removable sections of the multi-layered support surface assembly 100. The multi-layered support surface assembly 100 provides an alternate resource for consumable grow plate products, without which 3D printers would not operate, at a reduction in operator cost. The base and upper plate assemblies are provided with complete user instructions for maximizing object placement and building for early removal of completed object builds while taller layered objects continue to build without disruption. The ability provided by the multi-layered support surface assembly 100 to remove shorter layered builds disposed on the removable sections as they complete and allow the taller layered builds to continue growing optimally improves the process involved in 3D printing of more than one object at a time.

The foregoing examples and illustrative implementations of various embodiments have been provided merely for explanation and are in no way to be construed as limiting the embodiments disclosed herein. Dimensions of various parts of the multi-layered support surface assembly disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

I claim:

1. A multi-layered support surface assembly for a three-dimensional printer, the multi-layered support surface assembly comprising:

an electroplated base plate comprising one or more mounting elements and tabs configured to facilitate securement of the electroplated base plate to a support platform of the three-dimensional printer;

an uncoated sheet magnet layer disposed on a top surface of the electroplated base plate, wherein the uncoated sheet magnet layer comprises a top magnetic surface and a bottom adhesive surface, wherein the bottom adhesive surface of the uncoated sheet magnet layer is secured to the top surface of the electroplated base plate;

an electroplated upper plate disposed on the top magnetic surface of the uncoated sheet magnet layer, wherein the electroplated upper plate comprises one or more mounting elements corresponding to the one or more mounting elements of the electroplated base plate and configured to facilitate securement of the electroplated upper plate to the electroplated base plate;

a double-sided, high-heat-resistant, adhesive layer disposed on a top surface of the electroplated upper plate, wherein the double-sided, high-heat-resistant, adhesive layer comprises a top adhesive surface and a bottom adhesive surface, wherein the bottom adhesive surface of the double-sided, high-heat-resistant, adhesive layer is secured to the top surface of the electroplated upper plate; and a high-density, high-heat-resistant, foam grow surface pad secured to the top adhesive surface of the double-sided, high-heat-resistant, adhesive layer, wherein the high-density, high-heat-resistant, foam grow surface pad together with the electroplated upper plate secured thereto by the double-sided, high-heat-resistant, adhesive layer is cut into a plurality of removable sections of preselected configurations based on size and shape of a plurality of objects to be three-dimensionally printed thereon, and wherein, on completion of one or more of the objects built on one or more of the removable sections by the three-dimensional printer, the one or more of the removable sections with the built objects are configured to be lifted off the uncoated sheet magnet layer and removed from the electroplated base plate for further processing, without disturbing positions of incomplete objects being built on other of the removable sections.

2. The multi-layered, support surface assembly of claim 1, wherein the electroplated base plate is made of one of cold rolled steel and hot rolled pickled and oiled steel.

3. The multi-layered, support surface assembly of claim 1, wherein the electroplated upper plate is made of one of cold rolled steel and hot rolled pickled and oiled steel.

4. The multi-layered, support surface assembly of claim 1, wherein the electroplated upper plate is secured to the uncoated sheet magnet layer by a magnetic force of the top magnetic surface of the uncoated sheet magnet layer.

5. The multi-layered, support surface assembly of claim 1, wherein each of the top adhesive surface and the bottom adhesive surface of the double-sided, high-heat-resistant, adhesive layer comprises an adhesive material protected by a backing element, wherein the backing element on the bottom adhesive surface of the double-sided, high-heat-resistant, adhesive layer is removed to expose the adhesive material and fasten the bottom adhesive surface of the double-sided, high-heat-resistant, adhesive layer to the top surface of the electroplated upper plate, and wherein the backing element on the top adhesive surface of the double-sided, high-heat-resistant, adhesive layer is removed to expose the adhesive material and fasten a bottom surface of the high-density, high-heat-resistant, foam grow surface pad to the top adhesive surface of the double-sided, high-heat-resistant, adhesive layer.

6. The multi-layered, support surface assembly of claim 1, wherein the electroplated base plate and the electroplated upper plate are provided with user instructions for optimizing design placement, object placement, and object building for early removal of completed objects on the one or more of the removable sections while the incomplete objects continue to be built on the other of the removable sections without disruption.

7. A support surface assembly for a three-dimensional printer, the support surface assembly comprising a plurality of layers, wherein one or more of the layers are cut into a plurality of removable sections of preselected configurations based on size and shape of a plurality of objects to be three-dimensionally printed thereon, wherein, on completion of one or more of the objects built on one or more of the removable sections by the three-dimensional printer, the one or more of the removable sections with the built objects are configured to be removed for further processing, without disturbing positions of incomplete objects being built on other of the removable sections, and wherein the plurality of layers comprises:

a base plate configured to be secured to a support platform of the three-dimensional printer;

a sheet magnet layer secured to a top surface of the base plate;

an upper plate secured to a top surface of the sheet magnet layer;

an adhesive layer secured to a top surface of the upper plate; and a foam grow surface pad secured to a top surface of the adhesive layer, wherein the foam grow surface pad together with the upper plate secured thereto by the adhesive layer is cut into the plurality of removable sections of the preselected configurations based on the size and the shape of the plurality of objects to be three-dimensionally printed thereon.

8. The support surface assembly of claim 7, wherein the sheet magnet layer comprises a top magnetic surface and a bottom adhesive surface, wherein the bottom adhesive surface of the sheet magnet layer is secured to the top surface of the base plate.

9. The support surface assembly of claim 8, wherein the upper plate is secured to the sheet magnet layer by a magnetic force of the top magnetic surface of the sheet magnet layer.

10. The support surface assembly of claim 7, wherein the base plate and the upper plate are electroplated, and wherein the sheet magnet layer is uncoated.

11. The support surface assembly of claim 7, wherein the base plate comprises one or more mounting elements and tabs configured to facilitate securement of the base plate to the support platform of the three-dimensional printer.

12. The support surface assembly of claim 11, wherein the upper plate comprises one or more mounting elements corresponding to the one or more mounting elements of the base plate and configured to facilitate securement of the upper plate to the base plate.

13. The support surface assembly of claim 7, wherein the adhesive layer is a double-sided, high-heat-resistant, adhesive layer comprising a top adhesive surface and a bottom adhesive surface, wherein each of the top adhesive surface and the bottom adhesive surface of the adhesive layer comprises an adhesive material protected by a backing element, wherein the backing element on the bottom adhesive surface of the adhesive layer is removed to expose the adhesive material and fasten the bottom adhesive surface of the adhesive layer to the top surface of the upper plate, and wherein the backing element on the top adhesive surface of the adhesive layer is removed to expose the adhesive material and fasten a bottom surface of the foam grow surface pad to the top adhesive surface of the adhesive layer.

14. The support surface assembly of claim 7, wherein the foam grow surface pad is a high-density, high-heat-resistant, foam grow surface pad.

15. The support surface assembly of claim 7, wherein the base plate is made of one of cold rolled steel and hot rolled pickled and oiled steel, and wherein the upper plate is made of one of cold rolled steel and hot rolled pickled and oiled steel.

16. The support surface assembly of claim 7, wherein the base plate and the upper plate are provided with user instructions for optimizing design placement, object placement, and object building for early removal of completed objects on the one or more of the removable sections while the incomplete objects continue to be built on the other of the removable sections without disruption.

17. A method for assembling a multi-layered support surface assembly, the method comprising:

providing a plurality of layers comprising:

an electroplated base plate comprising one or more mounting elements and tabs configured to facilitate securement of the electroplated base plate to a support platform of a three-dimensional printer;

an uncoated sheet magnet layer comprising a top magnetic surface and a bottom adhesive surface;

an electroplated upper plate comprising one or more mounting elements corresponding to the one or more mounting elements of the electroplated base plate and configured to facilitate securement of the electroplated upper plate to the electroplated base plate;

a double-sided, high-heat-resistant, adhesive layer comprising a top adhesive surface and a bottom adhesive surface; and a high-density, high-heat-resistant, foam grow surface pad;

securing the bottom adhesive surface of the uncoated sheet magnet layer to a top surface of the electroplated base plate;

securing the electroplated upper plate on the top magnetic surface of the uncoated sheet magnet layer using a magnetic force of the top magnetic surface of the uncoated sheet magnet layer;

securing the bottom adhesive surface of the double-sided, high-heat-resistant, adhesive layer to a top surface of the electroplated upper plate;

securing the high-density, high-heat-resistant, foam grow surface pad on the top adhesive surface of the double-sided, high-heat-resistant, adhesive layer; and cutting the high-density, high-heat-resistant, foam grow surface pad together with the electroplated upper plate secured thereto by the double-sided, high-heat-resistant, adhesive layer into a plurality of removable sections of preselected configurations based on size and shape of a plurality of objects to be three-dimensionally printed thereon, wherein, on completion of one or more of the objects built on one or more of the removable sections by the three-dimensional printer, the one or more of the removable sections with the built objects are configured to be lifted off the uncoated sheet magnet layer and removed from the electroplated base plate for further processing, without disturbing positions of incomplete objects being built on other of the removable sections.

18. The method of claim 17, further comprising securing the multi-layered support surface assembly to the three-dimensional printer by:

securely mounting the electroplated base plate of the assembled multi-layered support surface assembly on the support platform of the three-dimensional printer using the mounting elements of the electroplated base plate; and securing the mounted electroplated base plate to the support platform of the three-dimensional printer by clamping the tabs of the electroplated base plate to the support platform of the three-dimensional printer.

19. The method of claim 18, further comprising:

(a) executing three-dimensional printing of the plurality of objects on the removable sections of the multi-layered support surface assembly by the three-dimensional printer in a batch process;

(b) on completing the three-dimensional printing of the one or more of the objects built on the one or more of the removable sections by the three-dimensional printer, momentarily terminating the three-dimensional printing of the objects;

(c) removing the one or more of the removable sections with the one or more of the objects built thereon by the three-dimensional printer from the uncoated sheet magnet layer and in turn, from the electroplated base plate, for further processing without disturbing positions of other of the objects being built on the other of the removable sections;

(d) resuming the three-dimensional printing of the other of the objects on the other of the removable sections by the three-dimensional printer; and (e) repeating steps (b), (c), and (d) until the three-dimensional printing of the plurality of objects is completed.

\* \* \* \* \*